(12) United States Patent
Liu et al.

(10) Patent No.: US 11,106,945 B2
(45) Date of Patent: Aug. 31, 2021

(54) TRAINING AND APPLICATION METHOD OF NEURAL NETWORK MODEL, APPARATUS, SYSTEM AND STORAGE MEDIUM

(71) Applicant: CANON KABUSHIKI KAISHA, Tokyo (JP)

(72) Inventors: Junjie Liu, Beijing (CN); Tsewei Chen, Tokyo (JP); Dongchao Wen, Beijing (CN); Hongxing Gao, Beijing (CN); Wei Tao, Beijing (CN)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/670,940

(22) Filed: Oct. 31, 2019

(65) Prior Publication Data

US 2020/0151514 A1    May 14, 2020

(30) Foreign Application Priority Data

Nov. 9, 2018 (CN) .......................... 201811331677.8

(51) Int. Cl.
  *G06K 9/62* (2006.01)
  *G06N 3/08* (2006.01)
  *G06N 3/04* (2006.01)

(52) U.S. Cl.
  CPC ......... *G06K 9/6262* (2013.01); *G06N 3/0454* (2013.01); *G06N 3/08* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 10,832,133 | B2* | 11/2020 | Matveev | G06N 3/0454 |
| 2016/0221190 | A1* | 8/2016 | Aloimonos | B25J 9/1661 |
| 2017/0345130 | A1* | 11/2017 | Wang | G06N 3/08 |
| 2018/0060649 | A1* | 3/2018 | Kastaniotis | G06K 9/00295 |
| 2018/0139458 | A1* | 5/2018 | Wang | H04N 19/17 |
| 2018/0322390 | A1* | 11/2018 | Das | G06F 9/30036 |
| 2019/0122077 | A1* | 4/2019 | Tsishkou | G06K 9/629 |

(Continued)

OTHER PUBLICATIONS

Jian Cheng,"Recent advances in efficient computation of deep convolutional neural networks," Front Inform Technol Electron Eng 2018 19(1): ,Crosschecked Jan. 26, 2018,pp. 64-72.*

(Continued)

*Primary Examiner* — Omar S Ismail
(74) *Attorney, Agent, or Firm* — Canon U.S.A., Inc. IP Division

(57) ABSTRACT

A training and application method for a neural network model is provided. The training method determines the first network model to be trained and sets a downscaling layer for at least one layer in the first network model, wherein the number of filters and filter kernel of the downscaling layer are identical to those of layers to be trained in the second network model. Filter parameters of the downscaling layer are transmitted to the second network model as training information. By this training method, training can also be performed even when the scale of the layer for training in the first network model is different from that of the layers to be trained in the second network model, and the amount of lost data is small.

26 Claims, 20 Drawing Sheets

(56) References Cited

U.S. PATENT DOCUMENTS

| | | | |
|---|---|---|---|
| 2019/0205748 A1* | 7/2019 | Fukuda | G06N 3/08 |
| 2019/0311249 A1* | 10/2019 | Zhang | G06F 17/15 |
| 2019/0378006 A1* | 12/2019 | Fukuda | G06K 9/6259 |
| 2020/0012940 A1* | 1/2020 | Liu | H04N 7/0135 |
| 2020/0110982 A1* | 4/2020 | Gou | G06F 16/904 |

OTHER PUBLICATIONS

Junho Yim,"Gift from Knowledge Distillation:Fast Optimization, Network Minimization and Transfer Learning," Proceedings of the IEEE Conference on Computer Vision and Pattern Recognition (CVPR), Jul. 2017, pp. 4134-4139.*

Yu Cheng,"Model Compression and Acceleration for Deep Neural Networks," IEEE Signal Processing Magazine,Jan. 9, 2018, pp. 127-134.*

Yoon Kim,"Sequence-Level Knowledge Distillation",arXiv:1606. 07947v4, Sep. 22, 2016, pp. 1-6.*

Doyeob Yeo1,"Sequential Knowledge Transfer in Teacher-Student Framework Using Densely Distilled Flow-Based Information," 2018 25th IEEE International Conference on Image Processing (ICIP),Sep. 6, 2018,pp. 674-677.*

He, K., et al.,"Mask R-CNN", Facebook AI Research (FAIR), Jan. 24, 2018.

* cited by examiner

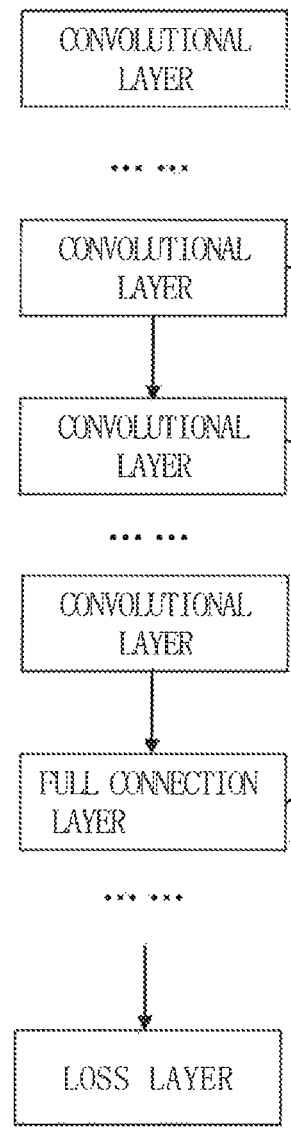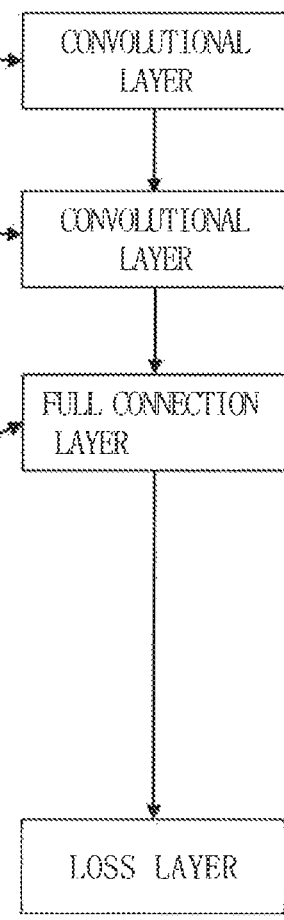
FIG. 4

KNOWLEDGE DISTILLATION BASED TRAINING

| INPUT: TEACHER NETWORK AND WEIGH $W^T$ AND STUDENT NETWORK AND WEIGHT $W^S$ |
|---|
| OUTPUT: KNOWLEDGE AGGREGATION RESULT $\widetilde{W}^T$ AND KNOWLEDGE DISTILLATION RESULT $W^S$ |
| INITIALIZING $\widetilde{W}^T$ AND $W^S$ <br><br> PERFORMING THE FOLLOWING PROCESSING WHEN THE ITERATIONS DO NOT REACH THE UPPER LIMIT: <br><br> OPTIMIZER 1 GROUPS THE T NETWORK AND PERFORMS A DOWNSCALING PROCESSING ON EACH GROUP TO OBTAIN KNOWLEDGE AGGREGATION RESULT $\widetilde{W}^T$ (ANALYSIS OF FORMULA 9) <br><br> OPTIMIZER 2 OPTIMIZES $W^S$ UNDER CONDITION OF THE SPARSENESS CONSTRAINT FOR KNOWLEDGE AGGREGATION RESULT $\widetilde{W}^T$ (ANALYSIS OF FORMULA 10) |

FIG. 19

TRAINING AND APPLICATION METHOD OF NEURAL NETWORK MODEL, APPARATUS, SYSTEM AND STORAGE MEDIUM

CROSS-REFERENCE TO RELATED APPLICATIONS

This application claims priority from Chinese Patent Application Number 201811331677.8 file on Nov. 9, 2018, the entirety of the disclosure being incorporated herein by reference.

FIELD

The present disclosure relates to a modeling field of Deep Neural Networks (DNN), in particular to a method of training other DNN models by using the trained DNN model.

DESCRIPTION OF THE RELATED ART

DNN model is a network model that has been successfully applied in the image processing field, especially in the fields of image classification, target detection, image division or the like. However, since a DNN model usually has a complicated network architecture and contains a large number of model parameters, a DNN model has the disadvantages of large computation and slow processing speed. This makes it difficult for DNN to be applied to real-time services, especially real-time services of embedded devices with poor computing capability.

Knowledge Distillation (KD) technique is a technique of performing compression and acceleration on DNN model in order to address the above problems. KD technique trains a simple network model by using information extracted from a complicated network model where training has already been completed (for example, network output value and feature map (Feature Map), etc.) such that the output of the simple network model is approximate to output of the complicated network model (i.e., residual error between the output of the simple network model and the output of the complicated network model is small), and then uses the trained simple network model to replace the complicated network model in the application of the real-time services. In the KD technique, however, only in a case where scale of layers from which a feature map is extracted in the complicated network model is identical to scale of layers which has been trained in the simple network model. That is, in a case where size of feature map extracted from the complicated network model is identical to size of feature map of layers to be trained in the simple network model, the simple network model can be trained by using the feature map extracted from the complicated network model. In other words, the scale of the layers to be trained in the simple network model is limited by the scale of the layer in the complicated network model.

In order to solve the problems existing in KD technique, FITNets technique was proposed. The main contents of FITNets technique include: setting a hint layer for layers to be trained in the simple network model, and performing an up-scaling processing on the layers to be trained by using the hint layer if the scale of the layers to be trained is smaller than that of the layer for training in the complicated network model. After the training is ended, a downscaling processing is performed on the layers to be trained by using the hint layer again.

Although the above FITNets can realize KD training when scale of the layer for training is different from scale of the layers to be trained, two approximate estimation processing of the up-scaling processing and the downscaling processing in FITNets will cause two times of data loss and thus decrease the precision of training results.

SUMMARY

The present disclosure is directed to provide a training scheme for the multi-layer neural network model. Compared with the FITNets technique, the present disclosure can execute KD training in a case where the scale of the layer for training in the complicated network is different from scale of the layers to be trained in the simple network, and can reduce data loss.

According to one aspect of the present disclosure, a method of training a multi-layer neural network model is provided which comprises: determining the first network model and the second network model, the first network model providing information for training the second network model; setting a downscaling layer for at least one layer in the first network model, wherein the number of filters and filter kernel of the downscaling layer are identical to those of layers to be trained in the second network model; transmitting filter parameters of the downscaling layer to the second network model as training information.

According to another aspect of the present disclosure, a system for training a multi-layer neural network model is provided which comprises: a server which stores at least one first network models, the first network model providing information for training the second network model, the server being used to set a downscaling layer for at least one of the first network models and outputting filter parameters of the downscaling layer as training information, wherein the number of filters and filter kernel of the downscaling layer are identical to those of layers to be trained in the second network model; a terminal which stores the second network model, the terminal being used to train layers to be trained in the second network model by using training information output by the server.

According to another aspect of the present disclosure, an apparatus for training a multi-layer neural network model is provided which comprises: a storage configured to store at least one network model, the network model providing information for training the network model in other apparatuses; one or more processors that are configured to set a downscaling layer for at least one layer of the network model stored in the storage, wherein the number of filters and the filter kernel of the downscaling layer are identical to those of the layers to be trained in the network model in other apparatuses; an output module configured to output filter parameters of the downscaling layer as training information to the other apparatuses.

According to another aspect of the present disclosure, an application method of a multi-layer neural network model is provided which comprises: storing a trained simple network model; receiving a data set corresponding to a task requirement that can be executed by the stored simple network model; computing the data set in each of layers from top to bottom in the stored simple network model, and outputting the results.

According to another aspect of the present disclosure, an application apparatus of a multi-layer neural network model is provided which comprises: a storage for storing a trained simple network model; a receiving module for receiving a data set corresponding to a task requirement that can be executed by the stored simple network model; a processing module for computing the data set in each of layers from top to bottom in the stored simple network model, and outputting the results.

According to another aspect of the present disclosure, a non-transitory computer-readable storage medium storing instructions for causing a computer to perform the above training method of the multi-layer neural network model when executed by the computer is provided.

Further features will become apparent from the following description of exemplary embodiments with reference to the accompanying drawings.

BRIEF DESCRIPTION OF THE DRAWINGS

The accompanying drawings, which are incorporated in and constitute a part of the specification, illustrate exemplary embodiments of the present disclosure and, together with the description of the exemplary embodiments, serve to explain the principles of the present disclosure.

FIG. 4 illustrates the one-to-one relationship between T network model and S network model.

FIG. 19 is a description of the trainings for a downscaling layer and S network model respectively by two optimizers.

DESCRIPTION OF THE EMBODIMENTS

Figure 1:
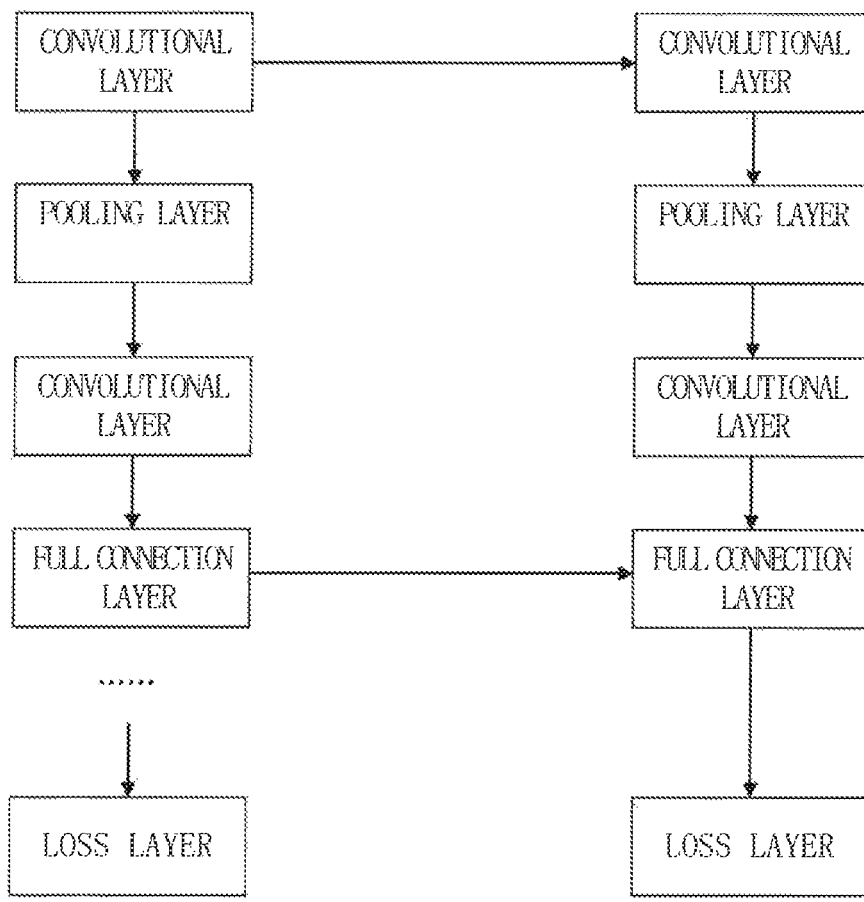
FIG. 1 is a schematic diagram of KD technique.

The KD technique is a technique which trains a DNN model with a simple architecture by using feature map and output extracted from a DNN model in which the training has been completed and has a complicated network architecture, so as to make output of the DNN model with the simple architecture and output of the DNN model with the complicated network architecture being approximate. FIG. 1 illustrates a schematic diagram of KD technique by taking a Convolutional Neural Network (CNN) model as an example.

Here, a network model in which the training has been completed, has a complicated network architecture and a strong data processing capability is called a Teacher network (abbreviated as T network) model, which is used to provide a network model to be trained with information for training, such as feature map information or other information. A network model to be trained with a simple network architecture and a relatively weak data processing capability is called a Student network (abbreviated as S network) model. S network model performs an optimization training on its own network model based on information provided by T network model until the output of S network model is approximate to that of T network model.

FIG. 1 shows an example of training a convolutional layer in S network model by extracting feature map from a convolutional layer of T network model. At every time of training, a computation is performed layer by layer from top to bottom in the S network model based on input of the previous layer, output (feature map) currently to be trained in the S network model is compared with feature map for training provided by the T network model, and model parameters in the S network model is optimized according to the comparison results, such that residual error between the feature map to be trained in the S network model and the feature map for training provided by the T network model become small gradually. After several times of training, the training of the S network model is completed when the residual error between the output of the S network model and the output of the T network model is less than the set value. Since the S network model has the characteristics that network architecture is simple and the contained model parameters are less, if the S network model of which training has been completed is used to replace the application of the T network model in the real-time services, especially in the real-time services of embedded devices, the S network model also has such advantages that the occupied storage space is small, calculation amount required in operation is less and inference time is short in a case where the application result and the T network model are approximate.

It should be noted that FIG. 1 is described by taking to train the convolution layer in the S network model as an example, and thus the feature map extracted herein is a feature map generated by the convolution kernel. Certainly, the present disclosure is not limited to train other layers in the S network model. For example, the Full Connection Layer of the S network model can be trained by extracting information for training from the Full Connection Layer of the T network model.

Figure 2A:
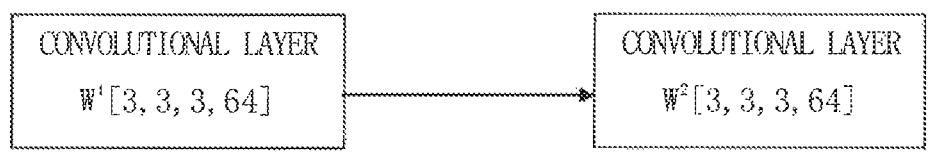
FIG. 2A and FIG. 2B illustrate examples where scales are identical and different, respectively.
Figure 2B:
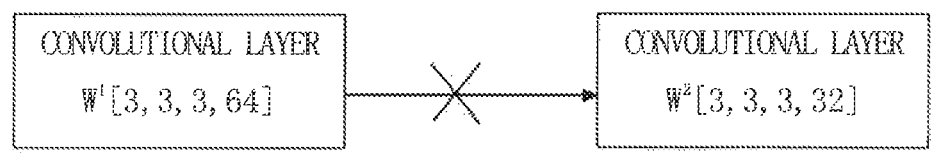

In the example shown in FIG. 1, the above KD training can be performed only when the scale of the convolution layer currently used for training in the T network model is identical to that of the convolution layer currently to be trained in the S network model. The scale here refers to the matrix dimension of the convolution kernel set. FIG. 2A and FIG. 2B respectively illustrate cases where the scale of the convolution layer of the T network model and the scale of the convolution layer of the S network model are identical and different. In the case shown in FIG. 2A, the convolution kernel $W^1$ in the convolutional layer of the T network model is [3,3,3,64], and the convolution kernel $W^2$ in the convolutional layer of the S network model is [3,3,3,64], both of which have the same scale. Therefore, the size of the feature map of $W^1$ is identical to that of the feature map of $W^2$, and the feature map of $W^1$ can be used for the training of the corresponding convolutional layer in the S network model. However, in the case shown in FIG. 2B, the convolution kernel $W^1$ in the convolutional layer of the T network model is [3,3,3,64], the convolution kernel $W^2$ in the convolutional layer of the S network model is [3,3,3,32], and the number of the convolution kernels of them is different, that is, the scales are different. Therefore, the size of the feature map of $W^1$ is different from that of the feature map of $W^2$, and the feature map of $W^1$ can not be used for the training of the corresponding convolutional layer in the S network model. Since the scale of the layers to be trained in the S network model must be identical to that of the layer for training in the T network model and the scale of the layer is usually larger in considering the T network model as a complicated network model with high performance, the scale of the layer in the S network model must also be larger, which is not conducive to design the S network model with simple network architecture, and the layer with larger scale will produce disadvantageous effects on the hardware design of the S network model.

Figure 3:
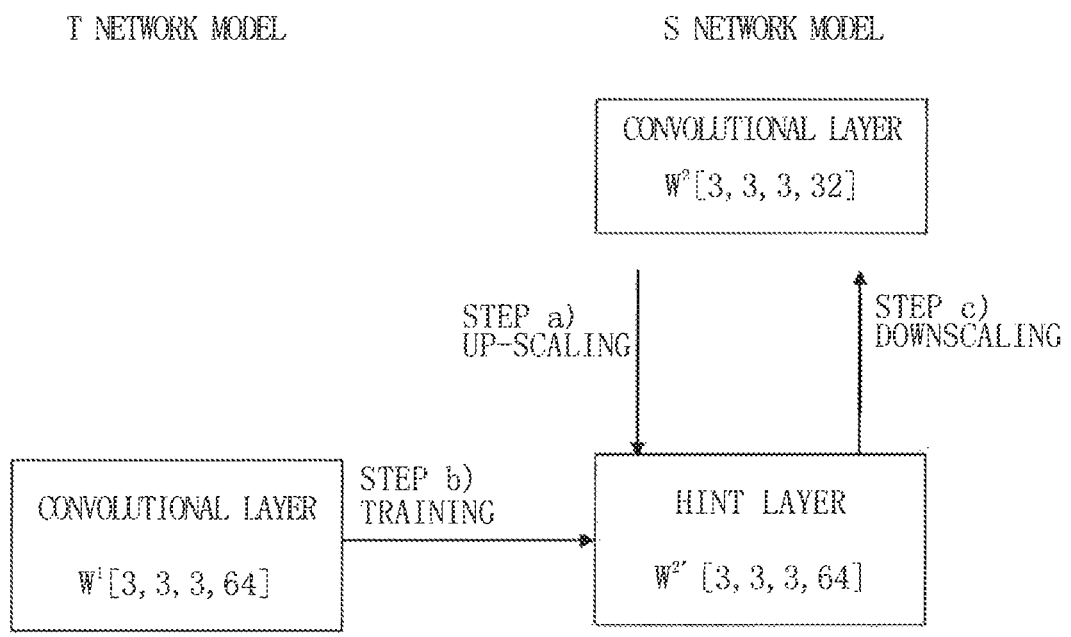
FIG. 3 is a schematic diagram of FITNets technique.

In view of this, the industry proposed FITNets technique. FIG. 3 shows the process of training the S network model by using FITNets technique. Assume that the convolution kernel $W^1$ of the convolutional layer for training in the T network model is [3,3,3,64], and the convolution kernel $W^2$ of the convolutional layers to be trained in the S network model is [3,3,3,32]. The FITNets technique mainly has the following three steps:

Step a): an up-scaling step. A hint layer approximate to the parameter distribution of the convolution kernel $W^2$ is set, and an approximate estimation processing is performed by using the hint layer. Specifically, the parameter distribution of the convolution kernel $W^{2'}$ of the hint layer is approximate to that of the convolution kernel $W^2$, $W^{2'}$ is expressed in [3,3,3,64], and its scale is identical to that of $W^1$. The hint layer simulates the convolution computation of $W^2$ locally based on the same input as $W^2$ layer. Step b): a training processing. The hint layer compares the feature map generated in the present layer with the feature map provided by $W^1$ to update the parameters in the hint layer based on a principle of making the output feature map generated by the hint layer more approximate to the feature map provided by $W^1$. Step c): downscaling step. The approximate estimation processing is performed by using the hint layer again. Specifically, the parameter distribution of $W^2$ is updated by using the updated parameter distribution in the hint layer to complete the FITNets process.

Although the KD training can be performed between the T network model and the S network model with different scales of layers by using the FITNets technique, the following problems still exist. Firstly, there are two approximate estimation processes in the FITNets technique, namely the up-scaling step and the downscaling step shown in FIG. 3, both of the two approximate estimation processes will cause data loss and produce disadvantageous effect on the precision of the training results. Secondly, one hint layer must be corresponded to one layer for training in the T network model and one layer to be trained in the S network model. In other words, one layer for training in the T network model must be corresponded to one layer to be trained in the S network model. As shown in FIG. 4, layers respectively belonged to the T network model and the S network model have a one-to-one relationship. Since the number of layers contained in the T network model is far more than that contained in the S network model, only a few layers in the T network model are used for the training of the S network model, and it causes the model parameters of the T network model being used insufficiently, which is disadvantageous to improve the training precision.

After fully considering the disadvantages of the above KD technique and FITNets technique, the present disclosure proposes an optimization method for training the multi-layer neural network model. When the scale of the layer for training in the T network model is greater than the scale of the layers to be trained in the S network model, a Downscaling Layer is set to at least one layer for training in the T network model, to perform a Downscaling processing on the layer for training in the T network model, such that the information for training output from the T network model is adapted to the layers to be trained in the S network model and thus the KD training is executed. It can be known by comparing the method of the present disclosure with the FITNets technique, in the method of the present disclosure, a Downscaling Layer (or called as a downscaling module) is set at the side of the T network model rather than set a hint layer at the side of the S network model, and the downscaling processing (i.e., set the downscaling layer to simulate the layer for training in the T network model) is only be performed once at the side of the T network model. Therefore, compared with two times of approximate estimation processing in the FITNets technique, the present disclosure losses less data, and has better precision. Preferably, the present disclosure also proposes a combination strategy for each of layers in the T network model. Specifically, the layers in the T network model are grouped, and each group can contain one or more layers. The layers within the group jointly performs the training on one layer in the S network model, that is, a training of one layer of the S network by one group of the T network model, so that the model parameters in the T network model can be more fully used and the training precision and efficiency of the S network model can be improved.

Hereinafter, various exemplary embodiments of the present disclosure will be described in detail with reference to the accompanying drawings of the specification. It should be understood that the present disclosure is not limited to various exemplary embodiments described below. In addition, as the solution for solving the problems of the present disclosure, it is unnecessary to include all combinations of features described in the exemplary embodiments.

The First Exemplary Embodiment

Figure 5:
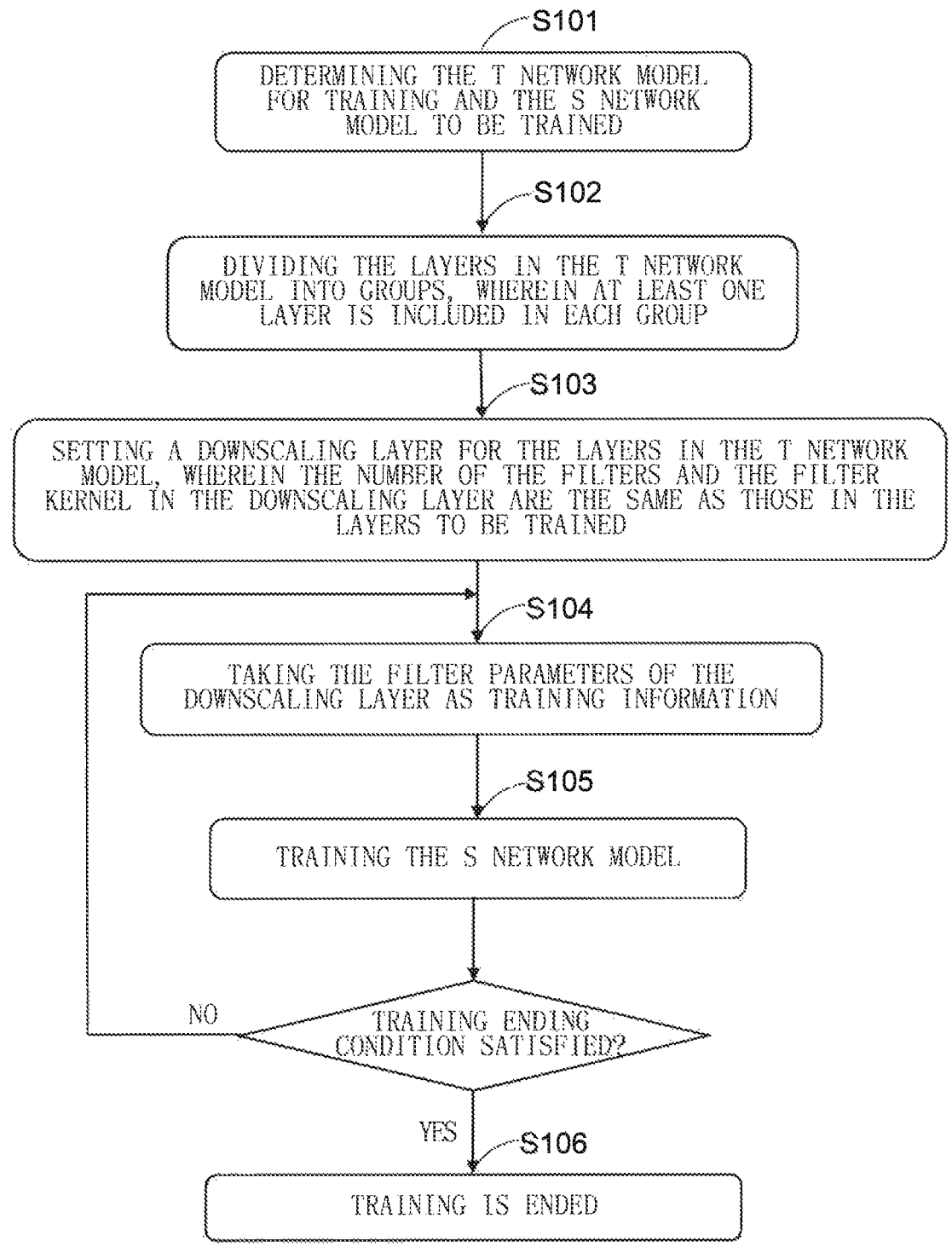
FIG. 5 is a flowchart of a training method for a neural network model of the first exemplary embodiment of the present disclosure.

FIG. 5 illustrates a training method of the neural network model of the first exemplary embodiment of the present disclosure. The specific description of the training method is as follows.

Step S101: determining the T network model for training and the S network model to be trained.

In the step S101, the T network model is a neural network model with the training having been completed and high depth and performance, which can be used to provide information for training the S network model to the S network model. The S network model is a neural network model to be trained (including the first training or after several training but training is not ended), which has a simpler network architecture than the T network model.

The term "information for training the S network model" in the present disclosure refers to information which is provided by the T network model and can be used to train the layers to be trained in the S network model to make the residual error between output result of the S network model and output result of the T network model become small gradually, for example, the filter parameters of a certain layer in the T network model (including filter weight and channel number, etc.). For another example, the output results of the T network model and S network model are also the information required for training the S network model.

The terms "complicated network architecture" and "simple network architecture" in the present disclosure are relative concepts to indicate that the T network model is deeper and has more complicated model structure than that of the S network model to be trained. A T network model with a depth of 50 layers and a S network model with a depth of 10 layers may be optional examples. In addition, the present disclosure does not limit the types of network models. An optional example is that: the T network model and S network model are convolutional neural network model, or other types of network model. In addition, the present disclosure does not limit the architecture of the network model. An optional example is that: the T network model may be a serial structure shown in FIG. 6A, or a serial structure shown in FIG. 6B, and it is the same for the S network model.

Step S102: dividing the layers in the T network model into groups, wherein at least one layer is included in each group.

The step S102 is a preferred step of the first exemplary embodiment of the present disclosure, but it is not a necessary step. The purpose of the step S102 is to achieve to train one layer in the S network by a plurality of layers in the T network model, so as to fully use the model parameters in the T network model. If the step S102 is performed, at least one group divided from the T network model includes a plurality of layers. One divided group corresponds to one layer to be trained in the S network model, and the layers in the group jointly train one layer in the S network model. If the step S102 is not performed, one layer in the T network model corresponds to one layer to be trained in the S network model, and one layer in the T network model trains the corresponding layer in the S network model. The grouping strategy in step S102 will be described in detail below.

Step S103: setting a downscaling layer for the layers in the T network model, wherein the number of the filters and the filter kernel in the downscaling layer are the same as those in the layers to be trained in the S network model.

The step S103 may set the downscaling layer in a case where the above grouping step S102 is executed, that is: the downscaling layer is set respectively for each group in the T network model; at this point, the number of filters of the set downscaling layer is identical to that of the layers to be trained and corresponding to the group in the S network model, and the filter kernel of the set downscaling layer is identical to that of the layers to be trained and corresponding to the group in the S network model, for example, the number of filters of the set downscaling layer and the number of filters of the corresponding layer to be trained both are 32 (or 64, etc.), and the filter kernels thereof both are 3*3 (or 5*5, 7*7, etc.). If the above grouping step S102 is not executed, the downscaling layer is set respectively for each of layers for providing the training information in the T network model; at this point, the set downscaling layer is corresponding to one layer for training in the T network model and one layer to be trained in the S network model, the number of filters of the downscaling layer is identical to that of the corresponding layer in the S network model, and the filter kernel of the downscaling layer is identical to that of the corresponding layer in the S network model.

Step S104: transmitting the filter parameters of the downscaling layer to the S network model as training information.

Taking a case where the above grouping step S102 has been executed and one downscaling layer is set respectively for each group as an example, since the downscaling layer can simulate computation of each of layers in the group and the number of the filters and the filter kernel in the downscaling layer are the same as those in the layers to be trained in the S network model, the filter parameters of the downscaling layer may be served as training information for training the S network model.

An optional structure of the downscaling layer is as follows: the downscaling layer includes a Basis Matrix layer and an Identity Mapping layer, the number of the filters and the filter kernel in the Basis Matrix layer are identical to those of the layers to be trained and corresponding to the group. The scale of the identity mapping layer is identical to that of the last layer within the group, that is, the size of the feature map of the identity mapping layer is identical to that of the last layer within the group. The Basis Matrix layer mainly simulates the computation of each of layers within the group. Information (content) saved in the input feature map of the identity mapping layer (the output feature map of the basis matrix layer) and the information (content) saved in the output feature map of the identity mapping layer are approximated, that is, the similarity between them is higher than the threshold.

With respect to the set basis matrix layer and the identity map layer, both of the basis matrix layer and the identity map layer are trained based on a principle that the residual error between the output feature map of the last layer within the group and the output feature map of the identity mapping layer is less than a set value when the same input feature map is input to the group and the basis matrix layer, so that the basis matrix layer can more accurately simulate the computation of each of layers within the group. Thus, the filter parameters of the basis matrix layer are output to the S network model as the information for training, which can improve the precision of the training of the S network model.

Step S105: training each of layers to be trained of the S network model by using the filter parameters of each downscaling layer as the training information, the output results of the T network model and the output results of the S network model.

In the step S105, during one training routine, the filter parameters for training the corresponding layer to be trained is output by each downscaling layer; at the end of one training, T network model and the S network model will output results respectively. An optional training routine is as follows: the filter parameters of the S network model are trained based on a principle of minimizing the difference between the filter parameters output by each downscaling layer and the filter parameters of the corresponding layer in the S network model and minimizing the difference between the output results of the T network model and the S network model.

After the step S105 is executed every time, it can be judged whether the training ending condition is satisfied currently. If yes, the processing proceeds to step S106. Otherwise, the steps S104 and S105 are executed repeatedly until the training ending conditions are satisfied. Here, the training ending condition may be any preset condition, for example, a condition where the residual error between the output of the S network model and the output of the T network model is less than a set value is served as the training ending condition, or a condition where the training number of the S network model reaches the predetermined number is served as the training ending condition.

Step S106: the training ending condition is satisfied and the training is ended.

Next, each step of the first exemplary embodiment of the present disclosure is described in detail.

<Grouping Strategy of Step S102>

The step S102 is a step in which, for each of layers to be trained in the S network model, the corresponding group are divide in the T network model. Taking the grouping shown in FIG. 6A as an example, it is assumed that there are three layers to be trained in the S network model, which are two convolutional layers and one full connection layer respectively from top to bottom. For the three layers to be trained, three groups are divided in the T network model (as shown in the three dotted boxes), and the groups divided in the T network model correspond to the layers to be trained in the S network model as shown in the arrows.

When the T network model is divided into groups, the types of layers contained in the group and the corresponding layer to be trained should be considered. Specifically, a group should contain layers of which the type is the same as the corresponding layer to be trained. Still taking the network model shown in FIG. 6A as an example, when the corresponding group is divided for the convolutional layer in the S network model, the group divided in the T network model should contain at least one convolutional layer. Certainly, other layers can also be included in the group, such as a pooling layer, a standardization layer or the like (not shown in FIG. 6A). When the corresponding group is divided for the full connection layer in the S network model, at least one full connection layer should be contained in the group. In the example shown in FIG. 6A, only one full connection layer is contained in the group.

As a preferred case, the divided group can include a standardized layer to eliminate the internal covariate shift between layers, so as to improve the training precision.

In addition, for the T network models with different depths, the cascade structure within the group may produce different content features. Therefore, in the T network models with different depths, the cascade structure within the group should also be different. In other words, the number of layers in the group can be determined according to the depth of the T network model. For example, the number of layers in the VGG network model is less than that of the ResNet50 network model, and in a case where the T network model is a VGG network model and the T network model is a ResNet50 network model, if groups are divided according to the same cascade structure, more layers in the ResNet50 network model cannot be divided into groups, which is disadvantageous to fully use the model parameters in the ResNet50 network model. Therefore, the number of layers contained in the group divided for the ResNet50 network model may be more than the number of layers contained in the group divided for the VGG network model. As an optional example, when the T network model is a VGG network model, the number of layers contained in the group is not more than 3; and when the T network model is the ResNet50 network model, the number of layers contained in the group is not more than 5.

Figure 6A:
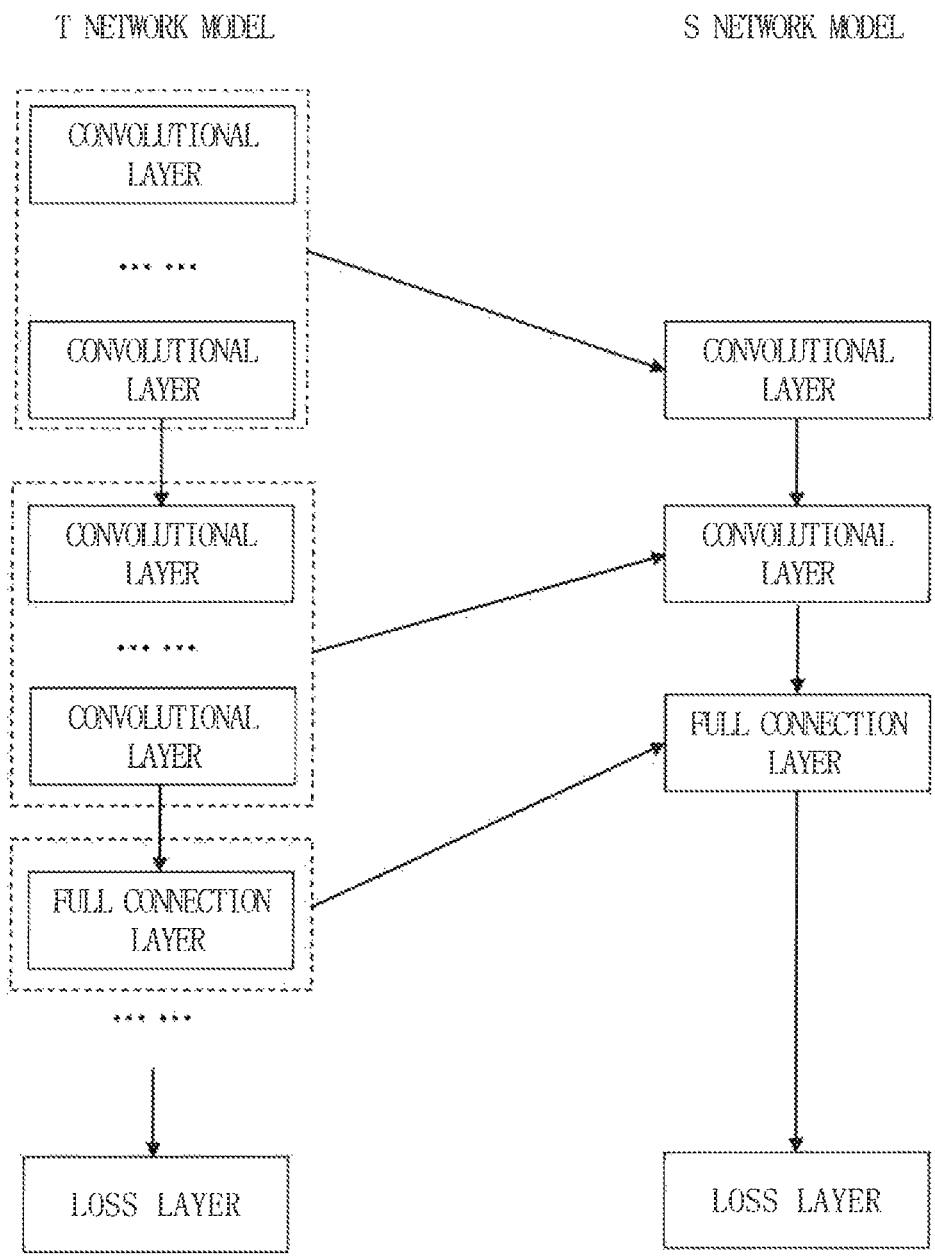
FIG. 6A and FIG. 6B respectively illustrate the grouping of T network model.
Figure 6B:
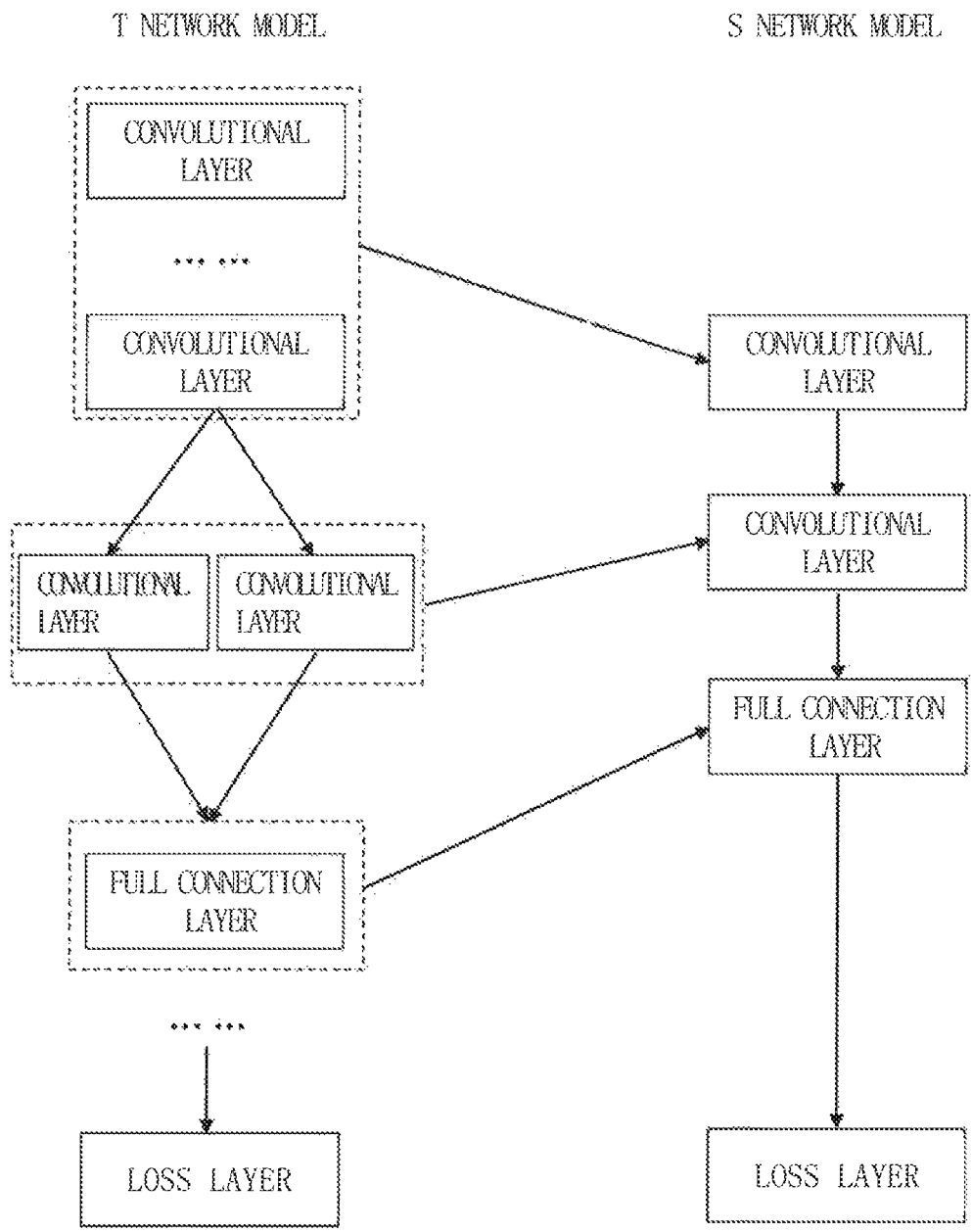

FIG. 6A describes the grouping by taking a case where the T network model is a serial structure as an example. If the T network model is a serial structure shown in FIG. 6B, a similar grouping strategy can be adopted for grouping, which will not be described here again.

<Downscaling Layer and Training Process>

Next, the downscaling layer in the step S103 and the training of the S network model in the step S104 and the step S105 are described.

Figure 7A:
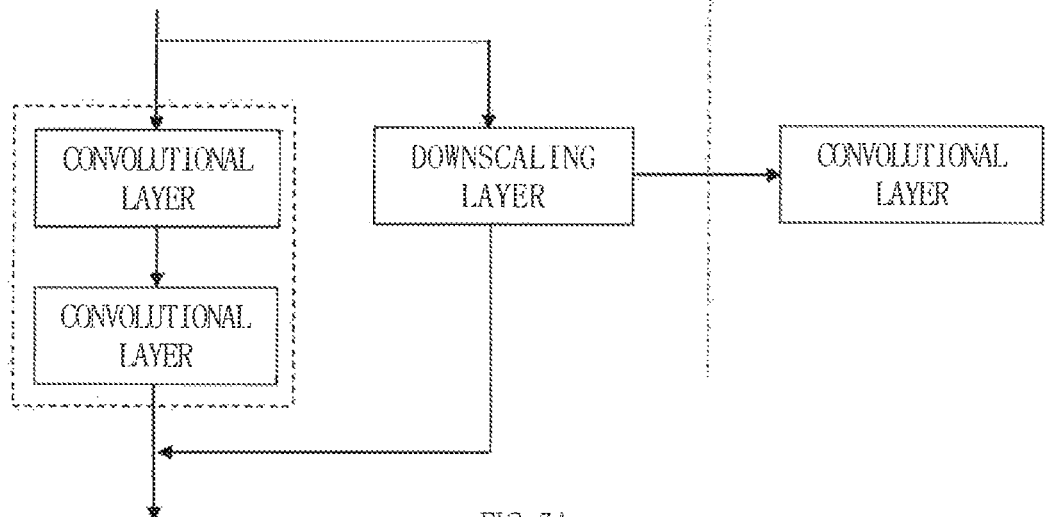
FIG. 7A and FIG. 7B respectively illustrate a schematic diagram of setting a downscaling layer in the T network model.
Figure 7B:
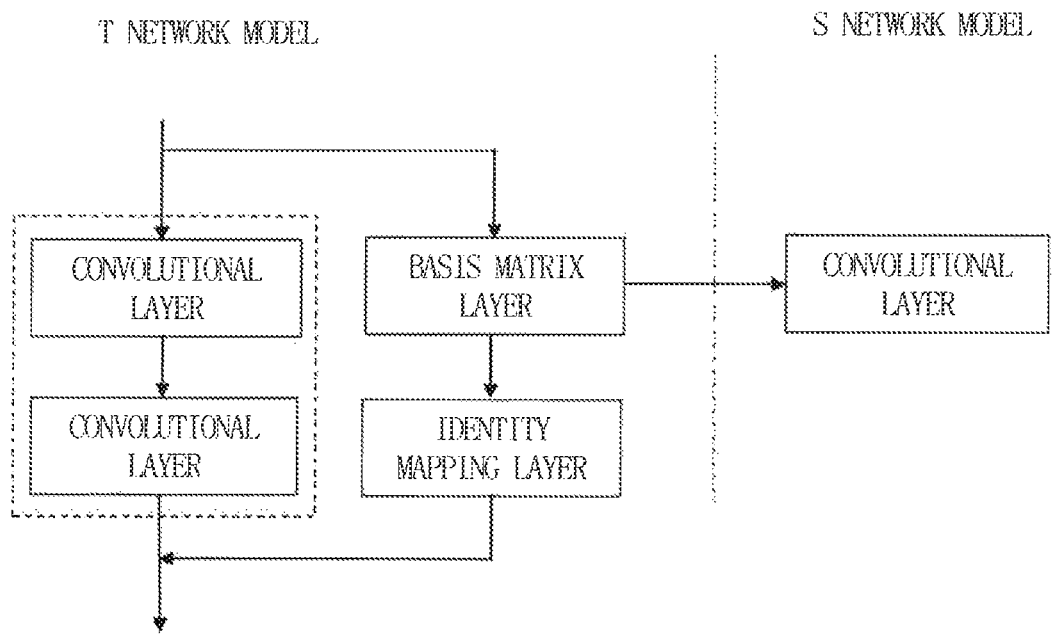
Figure 21:
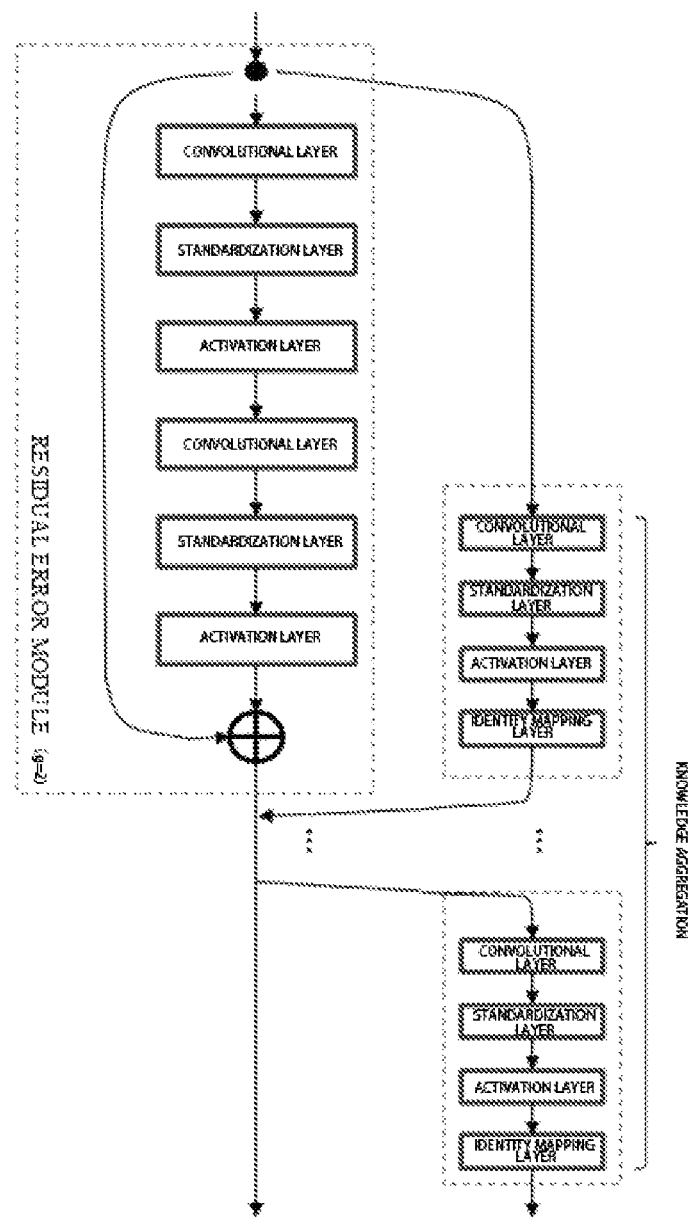
FIG. 21 is a schematic diagram of a downscaling layer in a residual error network architecture.

FIG. 7A and FIG. 7B show a schematic diagram of setting a downscaling layer for one group in the T network model. The downscaling layer includes a Basis Matrix layer and an Identity Mapping layer. In the initial state, after a layer to be trained in the S network model is determined and the layer to be trained is divided into a group in the T network model, a downscaling layer can be set for the group, and the basis matrix layer and the identity mapping layer therein can be initialized by a manner such as random initialization. Taking the residual error network structure as an example, FIG. 21 shows a network architecture of a downscaling layer, wherein a residual error module is taken as an example of one divided group, and g is the number of convolutional layers in the residual error module. FIG. 21 shows a plurality of residual error modules and their downscaling layers, but only one residual error module and two downscaling layers are shown in the figure.

The number of the filters and the filter kernel of the basis matrix layer are identical to those of the layers to be trained, and the scale of the identity mapping layer is identical to that of the last layer within the group. The reason for such design is as follows: it is desired that both of the basis matrix layer and the identity mapping layer can simulate the computation of the group, the basis matrix layer is the main computation layer, and the identity mapping layer is a layer that makes the output of the basis matrix layer (i.e. the input of the identity mapping layer) approximate to the output of the identity mapping layer. On the one hand, in order to realize the training of the S network model and cause the filter parameters (for example, the filter weight) output by the basis matrix layer being applied to the layers to be trained, the number of the filters in the basis matrix layer are designed to be identical to that of the layers to be trained, and the filter kernel of the basis matrix layer is designed to be identical to that of the layers to be trained. On the other hand, in order to train the basis matrix layer and the identity mapping layer and cause the basis matrix layer to correctly simulate the computation of the group, the scale of the mapping layer is designed to be identical to that of the last layer in the group; in this way, although the input feature map of the identity mapping layer (i.e., the output feature map of the basis matrix layer) and the output feature map of the identity mapping layer are different in size (scale), the similarity degree between information saved in them is high; after the size of the output feature map of the basis matrix layer are converted to be the scale same as the output feature map of the group by going through the identity mapping layer, the output feature map of the identity mapping layer and the output feature map of the last layer in the group can be compared, and the basis matrix layer and the identity mapping layer can be trained (that is, the parameters in the basis matrix layer and the identity mapping layer can be updated) according to the principle of making the residual error between the output of the identity mapping layer and the output of the group become small gradually.

Hereinafter, the training processing of the S network model and the downscaling layer is described by taking the network model shown in FIG. 8 as an example. It is assumed that: the layers to be trained in the S network model is a convolution layer, and its convolution kernel $W^s$ is [-, -, c, $m_1$], wherein c indicates the size (scale) of the input (the feature map output from the previous layer) of this layer, $m_1$ indicates the number of filters in this layer, and of course, $m_1$ also indicates the size of the feature map of this layer. For the purpose of convenience, the corresponding layer is named by using the convolution kernel, for example, the layers to be trained in the S network model is called the $W^s$ layer. The group corresponding to the $W^s$ layers in the T network model includes three convolution layers, namely $W^t_1$ layer [-, -, c, $n_1$], $W^t_2$ layer [-, -, $n_1$, $n_2$] and $W^t_3$ layer [-, -, $n_2$, $n_3$]. The downscaling layer set for group includes a basis matrix layer ($W^b$ layer) [-, -, c, $m_1$] and an identity mapping layer ($W^d$ layer) [-, -, $m_1$, $n_3$]. The filter number $m_1$ in $W^b$ layer is identical to that in $W^s$ layer, the filter kernel of $W^b$ layer is identical to that in $W^s$ layer, and the scale of the feature map of $W^d$ layer is identical to that of $W^t_3$ layer. Here, the sizes of the feature maps input from the previous layers of $W^b$ layer and $W^s$ layer both are c. Certainly, if the sizes of the input feature maps of $W^b$ layer and $W^s$ layer are different, it can make, by sampling the input feature map of $W^b$ layer, the sampled input feature map of $W^b$ layer to be same as the input feature map of $W^s$ layer in size. Alternatively, another layer is set on $W^b$ layer, and the size of the output feature map of the another layer is identical to that of $W^s$ layer.

Figure 8:
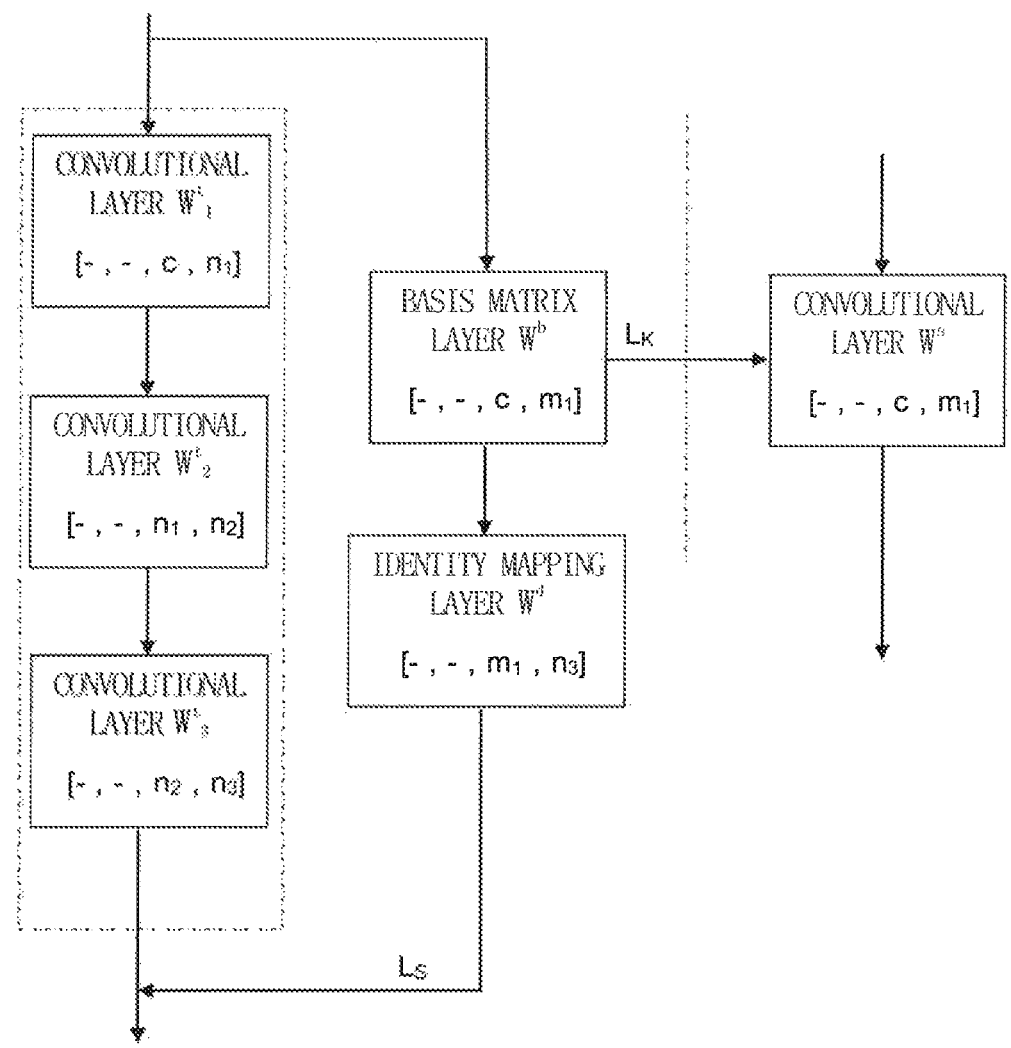
FIG. 8 is a network model with a downscaling layer.

Based on the network model shown in FIG. 8, after the basis matrix layer and the identity mapping layer are initialized by a random initialization manner, the basis matrix layer and the identity mapping layer are needed to be trained to make the output of the basis matrix layer be able to approximate to the output of the group gradually after going through the identity mapping layer, so that the filter parameters which is output from the basis matrix layer and is used to train $W^s$ layer can be used for training better. The training of the downscaling layer is described in detail below.

Input x is input into $W^t$ layer (including $W^t_1$ layer, $W^t_2$ layer and $W^t_3$ layer) to obtain output $y^t$ of the group; At the same time, the input x is also input to $W^s$ layer to obtain the output $y^s$ of the layers to be trained. To minimize the residual error between the output $y^t$ and output $y^s$, the optimization formula can be designed as the following formula 1, wherein $\Phi(\ )$ is sparse constraint; N is the total number of training samples, and i refers to the ith training sample; $\mathcal{L}(\ )$ is the loss function; $\lambda$ is the customized weight.

$$\mathrm{argmin}_{W^s}(\Sigma_{i=1}^N \mathcal{L}(y_i^t(x_i, W^t), y_i^s(x_i, W^s)) + \lambda\Phi(W^s)) \quad \text{formula 1}$$

Figure 20:
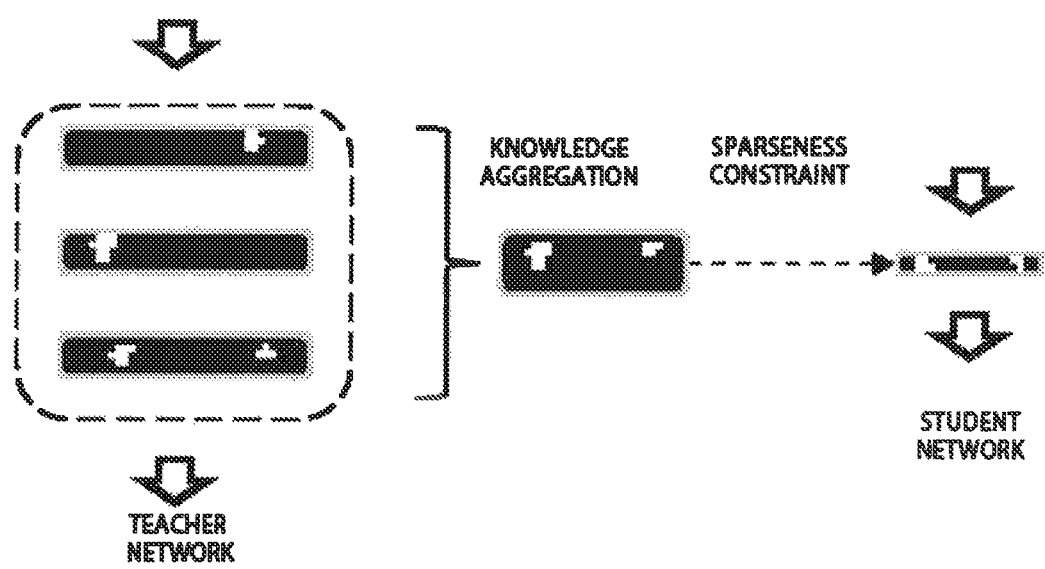
FIG. 20 is a conceptual diagram of formula 2.

In the group of the T network model, in order to aggregate the parameter distributions (group) from $W^t_1$ layer, $W^t_2$ layer and $W^t_3$ layer, it can assumed one auxiliary convolution parameter $\tilde{W}^t$, to make the output feature map subjected to the distribution calculation of the auxiliary convolution parameter $\tilde{W}^t$ being approximate to the original feature map $y^t$, and the formula 1 may be transformed into formula 2 at this time. $\psi(\ )$ in the formula 2 is defined as grouping, and the $W^t_1$ layer, $W^t_2$ layer and $W^t_3$ layer can be aggregated into one group (that is, knowledge aggregation strategy); $W^t$ in the formula refers to $W^t_1$, $W^t_2$ and $W^t_3$. The conceptual framework of the formula 2 is shown in FIG. 20, in which the white area refers to the important neuron (Dominant) and the black area refers to the less important neuron. As can be seen from FIG. 20, the important neurons in the teacher network are transferred to the student network after subjecting to the knowledge aggregation, and the student network is trained.

$$\mathrm{argmin}_{W^s, \tilde{W}^t}(\Sigma_{i=1}^N \mathcal{L}(y_i^t(x_i, W^t), y_i^s(x_i, W^s)) + \mathcal{L}(\tilde{W}^t, W^s) + \gamma\psi(\tilde{W}^t, W^t) + \lambda\Phi(W^s)) \quad \text{formula 2}$$

Wherein, the sparse constraint in formula 1 is realized by a sparse recoding function, which is shown in formula 3.

$$\Phi(W) = \Sigma_j \Phi_0(w_j) \quad \text{formula 3}$$

Wherein, the $\Phi(\ )$ is obtained by sum of formula 4, accumulation of piecewise function $\Phi_0(\ )$, w is a sampling point in the W, W is a parameter set.

$$\Phi_0(w) = \begin{cases} \frac{1}{\varepsilon}(|w| + w^2), & \text{if } |w| \geq \varepsilon \\ 0, & \text{otherwise} \end{cases} \quad \text{formula 4}$$

Wherein, $\varepsilon$ is a customized threshold.

Figure 9:
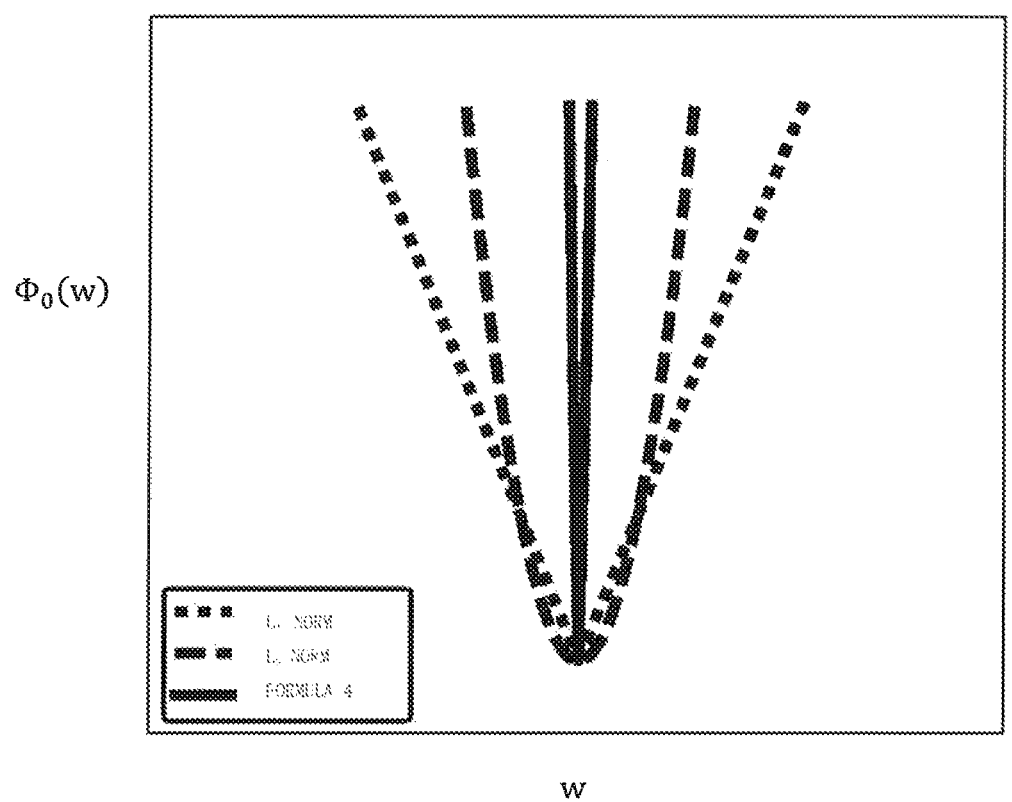
FIG. 9 is a comparison graph of function curve based on formula 4 and function curves based on $L_1$ norm and $L_2$ norm.
Figure 10:
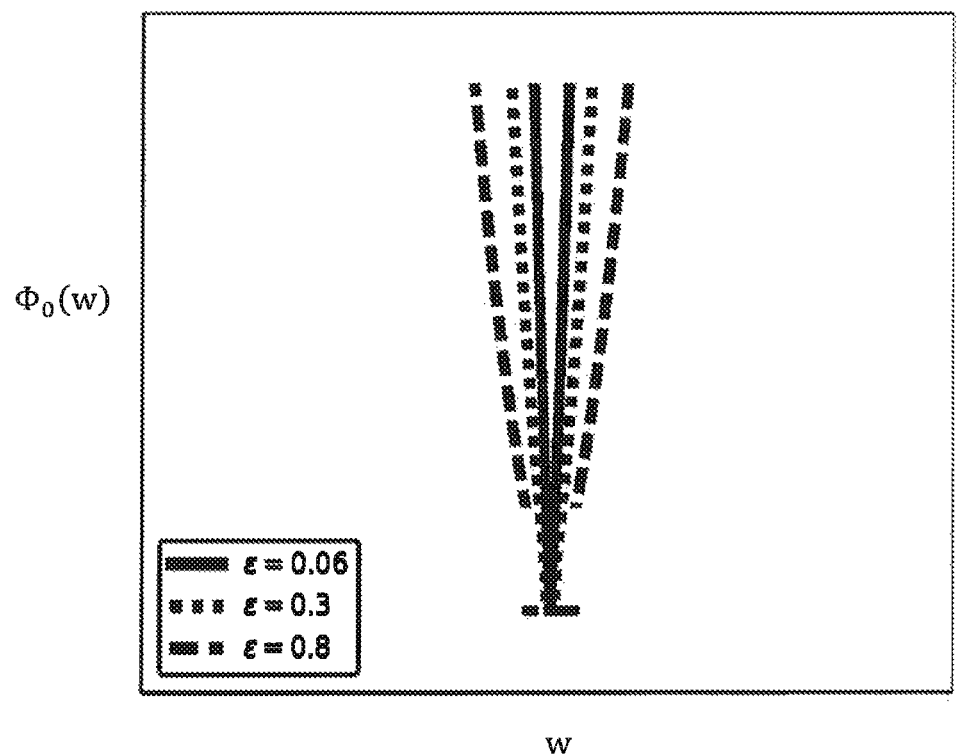
FIG. 10 is a schematic diagram of function curves based on formula 4 when $\varepsilon$ takes different values.
Figure 18:
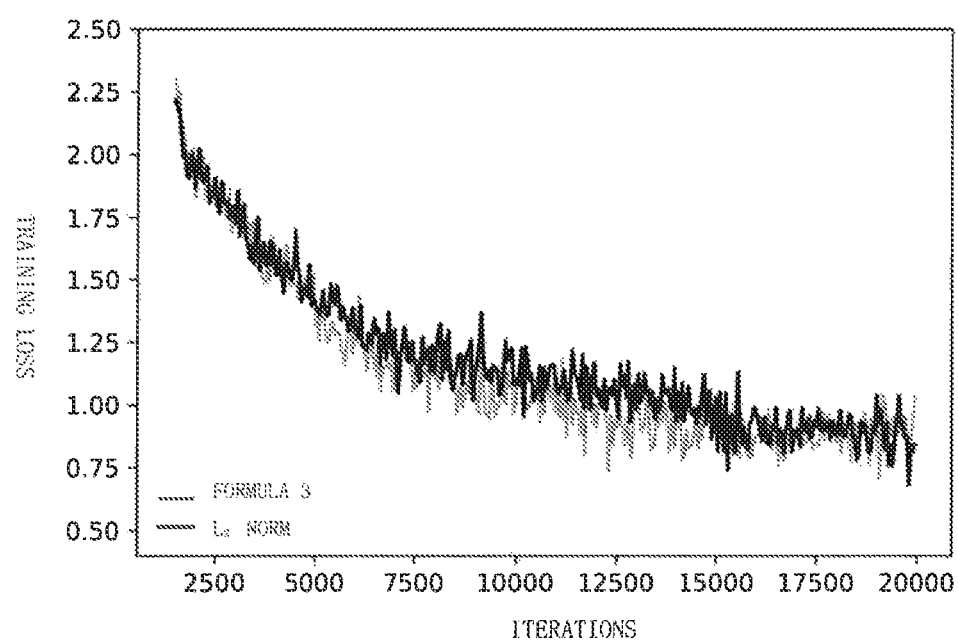
FIG. 18 shows training results based on formula 3 and $L_2$ norm.

FIG. 9 is a comparison graph of function curve based on formula 4 of the present embodiment and curves based on $L_1$ norm and $L_2$ norm, wherein the abscissa refers to the input parameter w, the ordinate is output of the function $\Phi_0(w)$. It can be seen from FIG. 9 that the function curve based on formula 4 is better than the function curves based on $L_1$ norm and $L_2$ norm. FIG. 10 is function curves when $\varepsilon$ in the formula 4 takes different values, wherein the abscissa refers to the input parameter w, the ordinate is output of the function $\Phi_0(w)$. It can be seen from FIG. 10 that the smaller the value of $\varepsilon$ is, the better the curve is. On the other hand, with reference to the training results in FIG. 18, the sparse constraint using formula 3 is easier to make the model being converged, in compared with the sparse constraint using $L_2$ norm.

On the other hand, for the knowledge aggregation strategy, by introducing the optimal transmission theory, the auxiliary parameter $\tilde{W}^t$ can be calculated according to the parameter distributions of $W^t_1$ layer, $W^t_2$ layer and $W^t_3$ layer, wherein for the definition of the optimal transmission theory, please see formula 5.

$$\mu(T(p_1)) = \nu(p_2) \quad \text{formula 5}$$

Wherein $p_1$ and $p_2$ are any two measurement points, $\mu$ and $\nu$ are corresponding measurement functions, and T is a transformation function, which enables $p_1$ be mapped into the parameter distribution domain of $p_2$. At this point, formula 6 is obtained according to the optimal transmission theory.

$$\min_{T: P_1 \to P_2} \int_{P_1} \tau(p_1, T(p_1)) d\mu(p_1) \quad \text{formula 6}$$

By minimizing the integral on the mapping domain $\mu(p_1)$ of the transmission loss function $\tau(\ )$, it can deemed that the distribution of $p_1$ is approximate to $p_2$, and thus formula 7 is obtained.

$$\Psi(\tilde{W}, W_{L_k^n}) = \min_{T: W_{L_k^n} \to \tilde{W}} \int_{W_{L_k^n}} \tau(w, T(w)) d\mu \quad \text{formula 7}$$

Assuming that $p_1$ is parameter distribution ($W^t_1$, $W^t_2$, $W^t_3$) of the original T network model, which is indicated by $W_{L_k^n}$; w is any sampling point on $W_{L_k^n}$, $T(w)$ is $\tilde{W}^t$, the following formula 8 is obtained by making the distributions of them being approximate.

$$\operatorname{argmin}_{\tilde{W}^t}\left(\sum_{i=1}^{N}\mathcal{L}(y_i^t(x_i, W^t), y_i^s(x_i, W^s)) + \right.$$

$$\left. \gamma \int_{W_{L_k^n}^t} \tau(w^t, T(w^T))d\mu(w^t)\right) \quad \text{formula 8}$$

Figure 11:
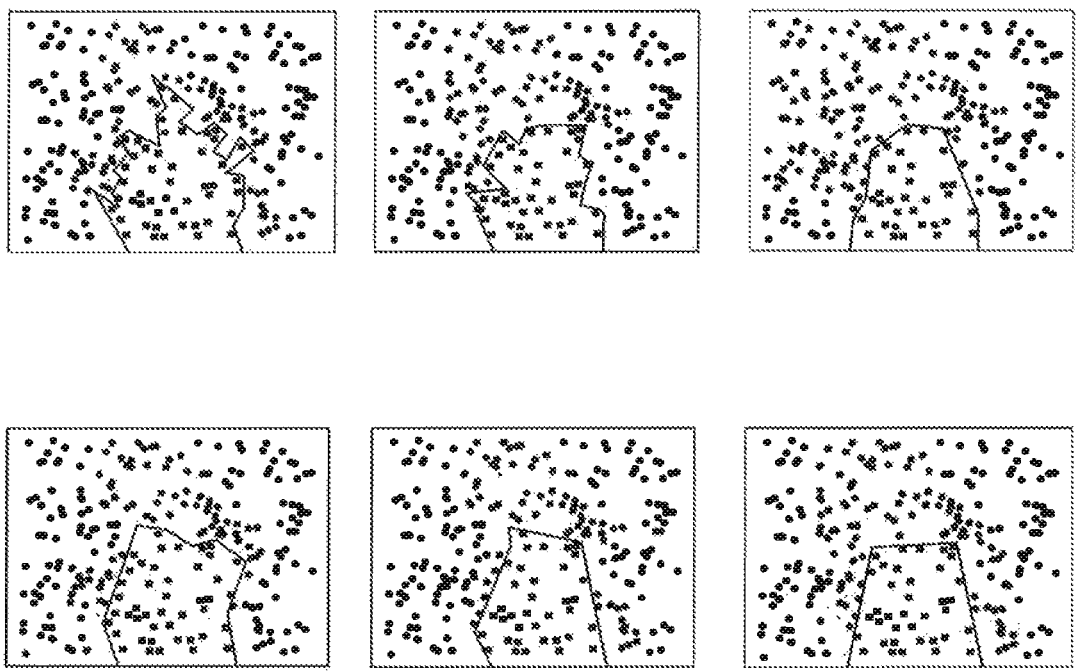
FIG. 11 is schematic diagrams of decision boundaries based on traditional DNN training and based on formula 9.

The approximate $\tilde{W}^t$ (constituting of $W^b$ and $W^d$ in FIG. 8) can be calculated, that is, training of $W^b$ layer and $W^d$ layer, according to $W^{t1}$, $W^{t2}$ and $W^{t3}$ by substituting into the optimization formula. Since the optimal transmission theory is inconsistent with the DNN optimization strategy, the approximate transformation is introduced as follows:

$$\operatorname{argmin}_{\tilde{W}^t}\left(\sum_{i=1}^{N}\mathcal{L}(y_i^t(x_i, W^t), y_i^s(x_i, W^s)) + \right.$$

$$\left. \gamma\mu(W_{L_k^n}^t)\|F_{W_{L_k^n}^t} - F_{\tilde{W}^t}\|_2\right) \quad \text{formula 9}$$

wherein, $$F_{W_{L_k^n}^t}$$

is output (a set of output feature maps) of $W_3^t$ in FIG. 8, and $F_{\tilde{W}^t}$ is output (a set of output feature maps) of $W^d$. The residual error between these two sets of output feature maps is less than a set value. More specifically, differences between feature maps in the same layer in these two sets of output feature maps is determined separately, and a sum of all the differences is made as the residual error between these two sets of output feature maps. The upper part of FIG. 11 describes a decision boundary on binary classification tasks based on traditional DNN training, and the lower part of FIG. 11 describes a decision boundary on the binary classification task based on the knowledge aggregation strategy of the formula 9 of the present embodiment. By comparison, it can be known that a more structured (smoother) decision boundary can be generated by using the algorithm of the formula 9.

$$\operatorname{argmin}_{W_s}\left(\mathcal{L}(\tilde{W}^t, W^s) + \lambda\sum_{j}\Phi_0(w_j^s)\right) \quad \text{formula 10}$$

Figure 12:
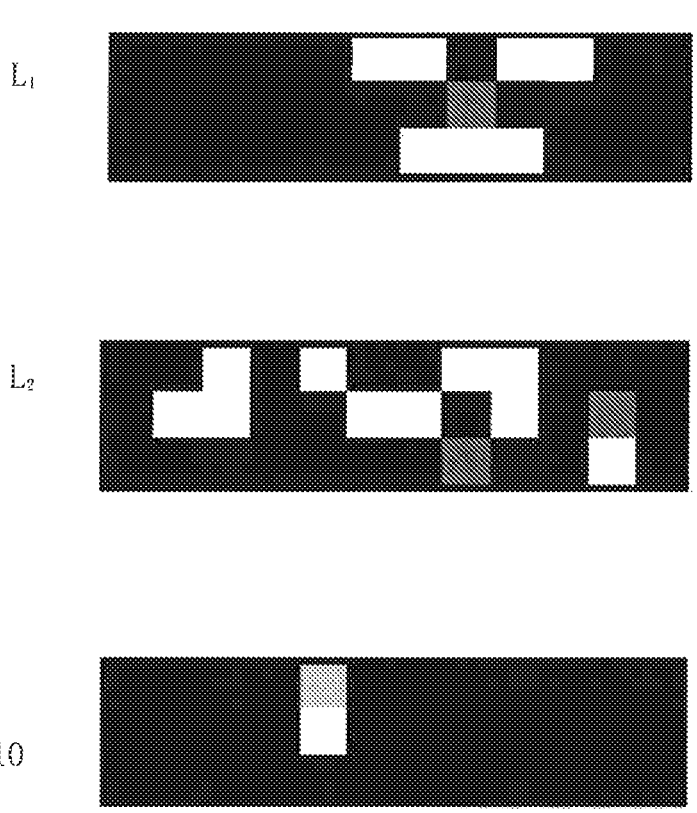
FIG. 12 is schematic diagrams of sparseness constraint based on formula 10 and sparseness constraint based on $L_1$ norm and $L_2$ norm.

According to the calculated $\tilde{W}^t$, $W^s$, that is, the training on $W^s$ layer, can be determined by the sparse constraint. FIG. 12 describes three parameters distribution graphs generated for $W^s$ by using a comparison of the sparse constraint $\lambda\Sigma_j\Phi_0$ $(w_j^s)$ in formula 10 with $L_1$ norm and $L_2$ norm. In FIG. 12, the white area refers to the important neurons (Dominant), the black area refers to the less important neurons, and the gray area is the neurons between the important neurons and the less important neurons. FIG. 12 sequentially shows the sparse constraint based on L1 norm, L2 norm and formula 10 from top to bottom. It can be seen from the figure that the sparse constraint based on formula 10 of the present embodiment has the best sparse effect.

In the first exemplary embodiment of the present disclosure, the output $L_{SP}$ of the $W^d$ layer and the output $L_{KD}$ from the $W^b$ layer to the $W^s$ layer are combined together by two neural networks trained with two different optimizers (such as SGD). When the training of the downscaling layer and the training of the S network model both reach to balance, the outputs of the two trainings can be convergent. Specifically, see FIG. 19, it is assumed that the two optimizers are optimizer 1 and optimizer 2 respectively, the weight parameters of $W^t$ layer in the T network model is input during the training based on the KD, $\tilde{W}^t$ and $W^s$ to be trained is initialized, and then $\tilde{W}^t$ and $W^s$ are optimized by the optimizer 1 and the optimizer 2.

It can be known from the above description, two kinds of trainings are included in the first exemplary embodiment of the present disclosure, one is the training of the S network model, and the other is the training of the downscaling layer (basis matrix layer and identity mapping layer). For the two kinds of trainings, there are two kinds of training manners of joint training and alternate training. The joint training refers to train the S network model and the downscaling layer simultaneously by using two optimizers (such as SGD). The alternate training refers to train the S network model and the downscaling layer alternatively by using one optimizer.

By the solution of the first exemplary embodiment of the present disclosure, only one downscaling processing is needed to be performed at the side of the T network model, then the training of the S network model can be achieved in a case where scale of the layer for training in the T network model is different from that of the layers to be trained in the S network model. The data loss can be reduced and the precision of training can be improved in comparison with the FITNets technique. In addition, by dividing the layers in the T network layer into groups, in the first exemplary embodiment of the present disclosure, compared with the one-to-one relationship between the layers in the T network model and the layers in the S network model in the FITNets technique, the training of the S network model for the one-to-one relationship between the groups (one layer or more layers) in the T network model and the layers in the S network model can more fully use the parameters in the T network model, improve precision of the training of the S network model, also make it easier for the output of the S network model to be approximate to the output of the T network model, and improve the efficiency of training.

The solution of the first exemplary embodiment of the present disclosure may be applied to a network model expressed in different bits. For example, in order to improve the computation precision, the output precision of the network model (T and S) in the present embodiment may be 32 bits, or, in order to improve the computation speed, the output precision of the network model in the present embodiment may be less than 32 bits, and even may be 2 bits or 1 bit. The present embodiment does not define the number of bits of the output precision of the network model. Certainly, regardless of the output precision of the network model, the last layer of the group in the T network model the identity mapping layer in the downscaling layer corresponding to this group have the same output precision, and the basis matrix layer in the downscaling layer and the layers to be trained have the same output accuracy.

Based on the training method of network model described in the first exemplary embodiment of the present disclosure, the S network model of which performance is equal to that of the T network model, but the structure is simple and the contained parameters is less can be obtained by the training. Instead of the T network model, the S network model obtained by training can be widely used in the real-time service, for example real-time services of image classification, object detection and scene division.

By comparing the operation results in different databases of the method of the first exemplary embodiment of the present disclosure with that of the traditional method, it can be seen that the method based on the first exemplary embodiment of the present disclosure can effectively reduce the number of parameters contained in the network model while ensuring better precision. Thereafter, the description will be made by using the training results from table 1 to table 4 respectively.

Table 1 shows the comparison results in terms of the training precision and the number of parameters in the network model when the traditional T network model, the traditional S network model, FITNet technique, FSP (Flow of Solution Procedure) technique and the method of the first exemplary embodiment of the present disclosure are applied to the CIFAR-10 data set.

TABLE 1

|  | Training precision (%) | The number of parameters (M: million) |
| --- | --- | --- |
| traditional T network model | 91.91 | ~0.36M |
| traditional S network model | 87.91 | ~0.12M |
| FITNets | 88.57 | ~0.12M |
| FSP | 88.70 | ~0.12M |
| first exemplary embodiment | 90.65 | ~0.09M |

Table 2 shows experimental results of application in CIFAR-10 data set.

TABLE 2

|  | Training precision (%) | The number of parameters (M: million) |
| --- | --- | --- |
| traditional T network model | 64.06 | ~0.46M |
| traditional S network model | 58.65 | ~0.19M |
| FITNets | 61.28 | ~0.19M |
| FSP | 63.33 | ~0.19M |
| first exemplary embodiment | 63.95 | ~0.17M |

Table 3 shows experimental results of application in TCIFAR-100 data set.

TABLE 3

|  | Training precision (%) | The number of parameters (M: million) |
| --- | --- | --- |
| traditional T network model | 61.25 | ~0.46M |
| traditional S network model | 54.37 | ~0.19M |
| FITNets | 56.77 | ~0.19M |
| FSP | 57.81 | ~0.19M |
| first exemplary embodiment | 60.03 | ~0.17M |

It can be seen from table 1 to table 3 that in the training of each data set, the training precision of the first exemplary embodiment of the present disclosure is slightly lower than that of the T network model, but better than that of other network models. In terms of the number of the contained parameters, the number of parameters of the optimization model in the first exemplary embodiment of the present disclosure is less than that of other network models.

Table 4 shows the experimental results application in the ImageNet data set. Top1 refers to the probability that the first training result is the correct result, and Top5 refers to the probability that there is a correct result among the five training results.

TABLE 4

|  | Top1 (%) | Top5 (%) | The number of parameters (M: million) |
| --- | --- | --- | --- |
| traditional T network model | 68.3 | 89.3 | ~5M |
| traditional S network model | 59.1 | 82.4 | ~4.2M |
| Distillation of traditional knowledge | 60.6 | 82.9 | ~4.2M |
| DeepRebirth | 62.6 | 85.1 | ~4.2M |
| first exemplary embodiment (without measurement function μ) | 61.3 | 83.9 | ~3M |
| first exemplary embodiment (with measurement function μ) | 62.8 | 85.3 | ~3M |

It can be seen from table 4 that in Top1 and Top5, the training precision of the first exemplary embodiment of the present disclosure is slightly lower than that of the T network model, but better that of other network models. In terms of the number of the contained parameters, the number of parameters of the optimization model in the first exemplary embodiment of the present disclosure is less than that of other network models.

The Second Exemplary Embodiment

Based on the first exemplary embodiment described above, the second exemplary embodiment of the present disclosure describes a training system of the network model, and the training system includes a terminal, a communication network and a server, wherein the terminal and the server communicates via the communication network, and the server trains S network model in the terminal online by using T network model stored locally, so that the terminal can use the trained S network model to perform real-time services. Each part of the training system of the second exemplary embodiment of the present disclosure is described below.

The terminal in the training system may be an embedded image acquisition device such as security camera, or may be a smart phone, PAD and other devices. Of course, the terminal may be other terminals with strong computing capability rather than the terminal with weak computing capability such as an embedded device. The number of terminals in the training system can be determined according to actual requirements. For example, if the training system is to train security cameras in the mall, all security cameras in the mall can be regarded as terminals. At this time, the number of terminals in the training system is fixed. For another example, if the training system is to train the smart phones of users in the mall, the smart phones connected to the wireless LAN of the mall can be regarded as terminals. At this time, the number of terminals in the training system is not fixed. In the second exemplary embodiment of the present disclosure, the type and number of terminals in the training system are not limited, as long as the S network model can be stored and trained in the terminal. The S network model herein has the same meaning as the S network model described in the first exemplary embodiment.

The server in the training system is a high-performance server with strong computing capability, such as cloud server. The number of servers in the training system can be determined according to the number of terminals served by the servers. For example, if the number of terminals to be trained in the training system is small or the region range where terminals are distributed is small, the number of servers in the training system is small, for example, only one server. If the number of terminals to be trained in the training system is large or the region range where terminals are distributed is large, the number of servers in the training system is large, such as the establishment of server cluster. In the second exemplary embodiment of the present disclosure, the type and number of servers in the training system are not limited, as long as at least one T network model can be stored in the server and information for training the S network model can be provided. The T network model herein has the same meaning as the T network model described in the first exemplary embodiment.

The communication network in the second exemplary embodiment of the present disclosure is wireless network or wired network for achieving information transmission between the terminal and the server. Any network currently available for up/down transmission between the network server and the terminal may be used as the communication network in this embodiment. The second exemplary embodiment of the present disclosure does not limit the type and the communication manner of the communication network. Certainly, second exemplary embodiment of the present disclosure is not also limited to other communication manner; for example, a third party storage area is allocated to this training system, and when one of the terminal and the server will transfer information to the other, the information to be transferred is stored in the third party storage area, and the terminal and the server regularly read the information in the third party storage area to realize the information transfer between them.

Figure 13:
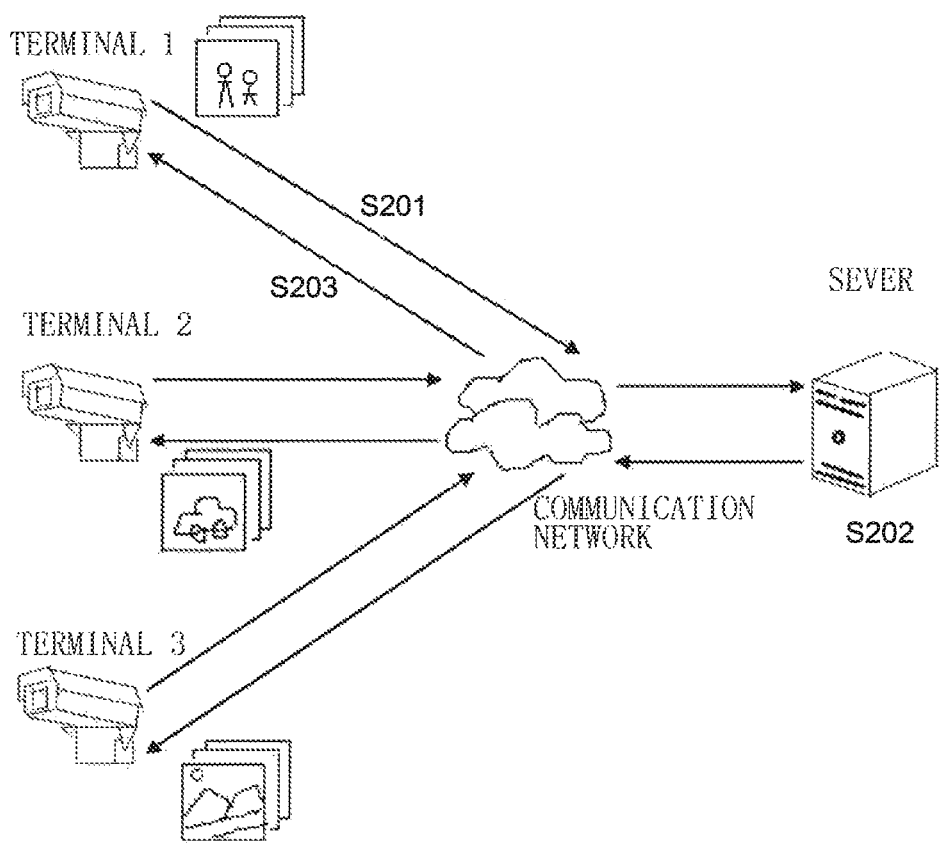
FIG. 13 is a schematic diagram of a training system of the second exemplary embodiment of the present disclosure.

In combination with FIG. 13, the online training process of the training system of the second exemplary embodiment of the present disclosure is described in detail below. FIG. 13 shows an example of the training system wherein three terminals (terminal 1 to terminal 3) and one server is included in the training system. The terminal can perform capturing in real time, wherein the terminal 1 captures a group of pictures of human body, the terminal 2 captures a group of pictures of cars, and the terminal 3 captures a group of pictures of scenery. It is assumed that the three terminals therein respectively store the S network models (such as micro network models) that can be trained and can process pictures, and the server therein stores the T network models with high performance and capable of performing picture processing. The training process of the training system is described as follows.

Step S201: initiating a picture processing request to the server by the terminal via the communication network.

The terminal initiates a picture processing request to the server via the communication network, wherein the terminal identity and the picture requested to be processed are included in the picture processing request. The terminal identity is information that uniquely represents the identity of the terminal (for example, the ID or IP address of the terminal). If the trigger condition for the terminal to initiate the picture processing request is that the pictures is captured and the services such as image recognition is requested, the picture requested to be processed is the picture captured by the terminal in real time. If the trigger condition for the terminal to initiate the picture processing request is to initiate a picture processing request at a fixed time, the picture requested to be processed is pictures captured recently.

This step S201 is illustrated by taking a case where the picture processing request is initiated by one terminal as an example. Of course, the picture processing request can also be initiated in parallel by a plurality of terminals. The processing of a plurality of terminals is similar to that of one terminal and will not be described here again.

Step S202: receiving the picture processing request by the server.

only one server is included in the training system shown in FIG. 13. Therefore, the communication network can transmit the picture processing request initiated by the terminal to this server. If the training system includes a plurality of servers, the picture processing request can be transmitted to a relatively idle server according to the idle state of the servers.

Step S203: responding to the received picture processing request by the server.

The server determines the terminal initiating the request according to the terminal identity contained in the received picture processing request, and then determines the S network model to be trained stored in the terminal. An optional manner is that the server determines the S network model to be trained stored in the terminal initiating the request according to the comparison table between the terminal and the S network model to be trained. Another optional manner is that the picture processing request contains information about the S network model to be trained, and the server can determine the S network model to be trained based on this information. Here, the determination of the S network model to be trained includes but is not limited to the determination of information representing the S network model such as the network architecture and model parameters of the S network model.

When the server determines the S network model to be trained, the method of the first exemplary embodiment of the present disclosure can be adopted to train the S network model stored in terminal initiating the request by taking the pictures contained in the picture processing request as input and using the T network model stored locally in the server. The specific training process includes:

The first step: the server can previously perform grouping of the T network model according to the layers to be trained in the S network model. If a plurality of T network models are stored in the server, the T network model for training can be determined according to the service information (such as face recognition service and object detection service) in the received picture processing request.

The second step: the server sets the corresponding downscaling layer for each group.

The third step: on the one hand, the server determines the filter parameters which are provided to the terminal and used to train the S network model in the manner described in the first exemplary embodiment; on the other hand, the server trains the downscaling layer in the manner of the first exemplary embodiment, and includes: by using the pictures contained in the picture processing request as input, a computation is performed layer by layer from top to bottom within the T network model; at the same time each downscaling layer also performs computation in the present layer according to the input in the previous layer, and then the downscaling layer is trained according to the output of the downscaling layer and the output of the corresponding group, based on the principle of minimizing residual error between them. It is noted that the downscaling layer and the S network model can be trained in a joint manner or an alternate manner. Of course, it is also possible to only train the S network model here after the training of the downscaling layer is completed in advance.

The fourth step: the server transmits will information for training the S network model (for example, filter parameters for training of the downscaling layer, output of the T network model of the server in local, etc.) to the terminal via the communication network, so that the terminal trains, according to the received information for training, the S network model stored in local, and thus to achieve online training of the S network model. Specifically, in the case that a plurality of groups are divided in the T network model, the server can broadcast/unicast the following packet to the terminal via the communication network: the body of the packet contains the filter parameters output by the downscaling layer and the output results of the T network model; the head of the packet contains the terminal identity of the terminal to be trained. When the terminal receives the packet broadcasted/unicasted by the server, the terminal firstly determines whether it is a packet to be transmitted to itself according to the terminal identity in the head of the packet; if yes, after de-packaging, the model parameters of each of layers of the S network model were optimized by using pictures contained in the picture processing request and information for training of the body of the packet, in order to make the output results of the S network model being converged to the output results of the T network model and the residual error between the filter parameters of the layers to be trained in the S network model and the received filter parameters of the downscaling layer be minimized, and thus to realize the training of the S network model.

In the training system shown in FIG. 13, the picture processing request is initiated actively by the terminal. Alternatively, the second exemplary embodiment of the present disclosure is not limited to such case where the inquiry message is broadcasted by the server, and the above training process is executed by the terminal after responding to the inquiry message.

Through the training system described in the second exemplary embodiment of the disclosure, the S network model in the terminal can be trained online, which improves the flexibility of training. The terminal performs real-time applications such as object detection and face recognition by using the trained S network model with simple architecture, which greatly improves the service processing capability of the terminal and expands the service processing scene of the terminal.

The above second exemplary embodiment describes the training system by taking online training as an example, but the present disclosure is not limited to the offline training process, which will not be described here again.

The Third Exemplary Embodiment

Figure 14:
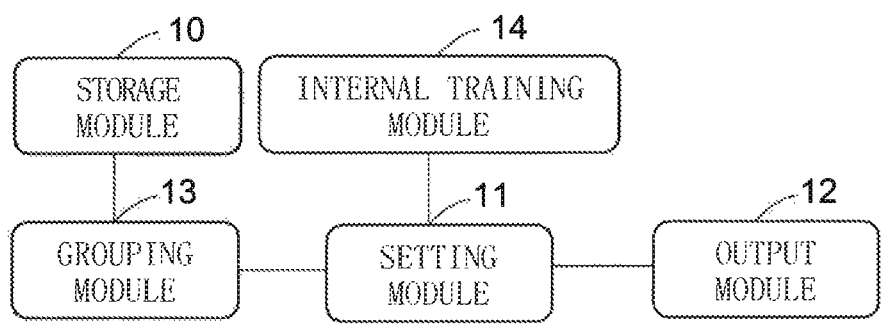
FIG. 14 is a software schematic diagram of a training apparatus of the third exemplary embodiment of the present disclosure.

The third exemplary embodiment of the present disclosure describes a training apparatus of multilayer neural network model, the apparatus can perform processing at the side of the T network model described in the first exemplary embodiment, and the apparatus may be an apparatus in the server described in the second exemplary embodiment. With reference to FIG. 14, the software structure of the apparatus will be described in detail below.

The training apparatus of the present embodiment includes a storage 10, one or more processors 11 and an output module 12, wherein the storage 10 is configured to store a network model of at least one multi-layer neural network, and the network model provides information for training the network model in other apparatuses. The processors 11 are configured to set a downscaling layer for at least one layer of the network model stored in the storage 10, wherein the number of the filters and the filter kernel of the downscaling layer are identical to that of the layers to be trained in the network model of the other apparatuses. The output module 12 is configured to output the filter parameters of the downscaling layer as training information to the other apparatuses.

Alternatively, the training apparatus also includes: a grouping module 13 configured to group the layers in the network model stored in the storage 10. Each group corresponds to one layer to be trained in the network model of the other apparatuses, wherein each group includes at least one layer. The processors 11 are used to set the downscaling layer for each group, wherein the number of the filters and filter kernel of the downscaling layer set for the group are identical to those of the layers to be trained corresponding to this group. Specifically, the grouping module 13 can perform grouping by using the grouping strategy described in the first exemplary embodiment.

Alternatively, the output module 12 not only outputs the filter parameters of the downscaling layer as the training information, but also outputs the output result of the network model stored in the storage 10 as the training information after the end of the operation of, from top to bottom in the network model, the data such as image.

The downscaling layer sequentially includes the basis matrix layer and the identity mapping layer. The number of the filters and filter kernel of the basis matrix layer are identical to those of the corresponding layer to be trained. The size of the output feature map of the identity mapping layer is identical to that of the last layer in the group. The training apparatus also includes an internal training module 14 configured to train the basis matrix layer and the identity mapping layer, so that the residual error between the output feature map of the last layer in the group and the output feature map of the identity mapping layer is less than a set value when the input feature map of the first layer in the group is identical to the input feature map of the basis matrix layer. Specifically, the basis matrix layer and the identity mapping layer may be trained in the manner described in the first exemplary embodiment.

The training apparatus of this embodiment also has a module for realizing the function of the server in the training system, such as the recognition function of the received data, data package function, network communication function, etc., which are not described here again.

Figure 15:
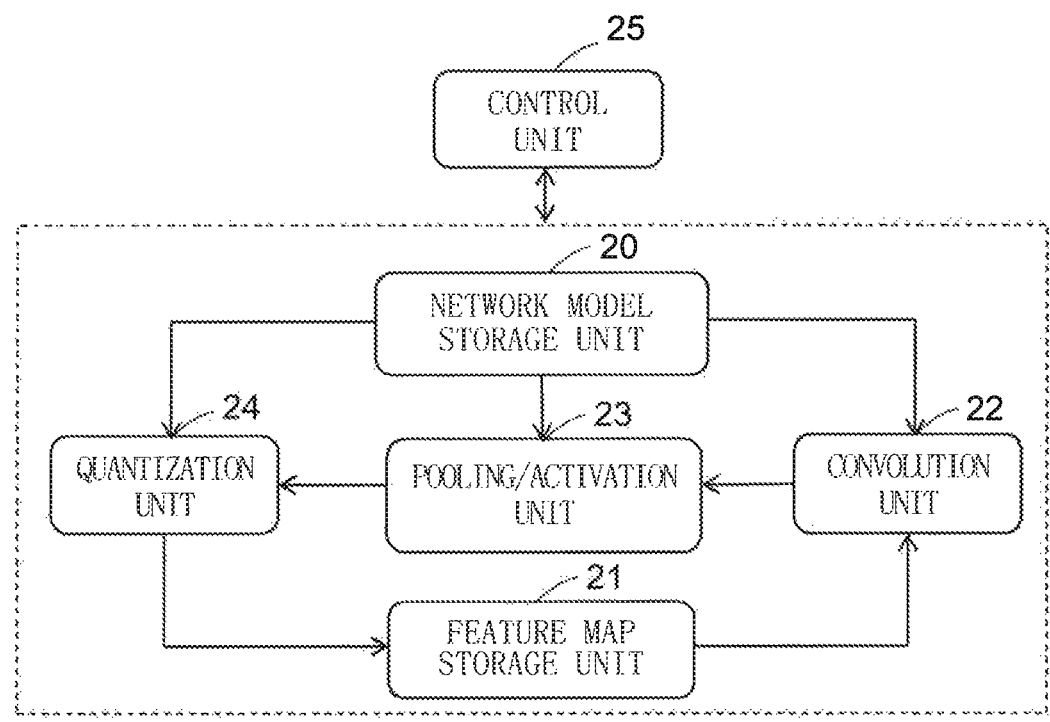
FIG. 15 is a hardware schematic diagram of a training apparatus of the third exemplary embodiment of the present disclosure.

The training apparatus of the third exemplary embodiment of the disclosure can operate in the hardware structure shown in FIG. 15. When the structure shown in FIG. 15 receives a data set, it can process the received data set and finally output the feature map for training the network model stored in other apparatuses. See FIG. 15, the hardware structure of the training apparatus includes: a network model storage unit 20, a feature map storage unit 21, a convolution unit 22, a pooling/activation unit 23, a quantization unit 24 and a control unit 25. Each unit is described below.

The network model storage unit 20 stores the related information of the T network model described in the first exemplary embodiment of the present disclosure, and includes but not limited to: the structure information of the T network model, the information required to execute computations in each of layers, the grouping information of the T network model and the information of the downscaling layer set for each group. The feature map storage unit 21 stores the feature map information required during computation by each of layers in the t-network model.

The convolution unit 22 is used to perform the convolution processing on the data set according to the information input from the network model storage unit 20 and the information input from the feature map unit 21 (for example, the input feature map of the ith layer). Here, the information input from the network model storage unit 20 includes but is not limited to: parameters required for the convolution computation of the convolution layer itself. If the downscaling layer is set for the convolution layer, the information of the downscaling layer can also be input. After the filter parameters for training the network model in other apparatuses are determined by using the downscaling layer, it can be output through the input/output interface (not shown in FIG. 15).

The pooling/activation unit 23 is used to perform a pooling/activation processing on the data set according to the information input by the network model storage unit 20 (such as the information required when performing the pooling/activation processing) and the output of the convolution unit 22. The quantization unit 24 is used to perform a quantization processing on the data set according to the quantization related parameters input by the network model storage unit 20 and the results output from the pooling/activation unit 23. The quantized results are stored in the feature map storage unit 21.

The control unit 25 outputs control signals to each unit in FIG. 15 to control the operation of the network model storage unit 20 to the quantization unit 24.

It is to be noted, FIG. 15 describes an example that the pooling/activation unit 23 and the quantization unit 24 are included. Of course, the training apparatus may also not include the pooling/activation unit 23 and the quantization unit 24, or the training apparatus may also include other unit capable of performing a regularization processing and a zoom processing, which is not described here again.

The Fourth Exemplary Embodiment

Figure 16:
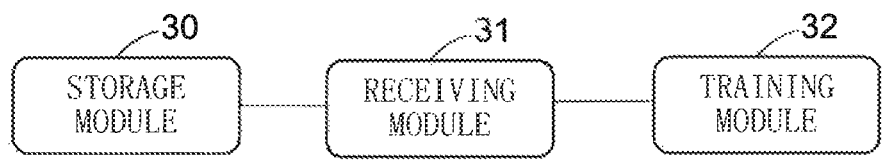
FIG. 16 is a software schematic diagram of a training apparatus of the fourth exemplary embodiment of the present disclosure.

The fourth exemplary embodiment of the present disclosure describes a training apparatus of the multilayer neural network model, the apparatus can perform the processing of the S network model side described in the first exemplary embodiment, and the apparatus can be an apparatus in the terminal described in the second exemplary embodiment. With reference to FIG. 16, the software structure of the apparatus is described in detail below.

The training apparatus of the present embodiment comprises a storage 30, a receiving module 31 and a training module 32, wherein the storage 30 is configured to store network models. The receiving module 31 is configured to receive the filter parameters for training, and the number of the filters and filter kernel corresponding to the received filter parameters are identical to those of the layers to be trained in the network model stored in the storage 30. The training module 32 is configured to train the layers to be trained based on the received filter parameters.

Preferably, the receiving module 31 can also receive the output results of the network model provided by the network model transmitting the filter parameters after running data; The training model 32 can train the layers to be trained by using the received filter parameters as training information and the output results of the network model and combining the output results of the network model stored in the storage 30.

The training apparatus of the present embodiment also has a module to realize the function of the terminal in the training system, such as the function to unpack the received data, the function to initiate the request and the network communication function, etc., which are not described here again.

Figure 17:
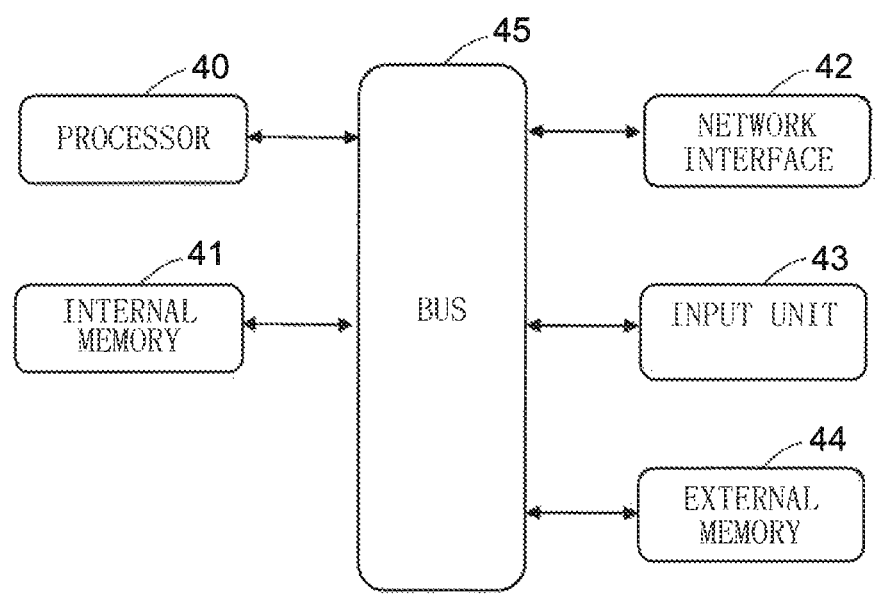
FIG. 17 is a schematic diagram of an application environment in which training apparatuses of the third and fourth exemplary embodiments of the present disclosure are operated.

Hereinafter, with reference to FIG. 17, it is to describe the environment to which the training apparatus of the multi-layer neural network model in the third exemplary embodiment of the present disclosure and the training apparatus of the multi-layer neural network model in the fourth exemplary embodiment are applied. In the application environment shown in FIG. 17, device including a processor 40, an internal memory 41, a network interface 42, an input unit 43, an external memory 44, and a bus 45 supports the normal operation of the training apparatus.

The processor 40 may be a CPU or a GPU for performing overall control of the training apparatus. The internal memory 41 includes a random access memory (RAM), a read-only memory (ROM), etc. The RAM can be used as the main memory, working area or the like of processor 40. The ROM can be used to store the control program of processor 40; in addition, it can also be used to store files or other data to be used when the control program is operated. The network interface 42 can be connected to the network and implement network communication. The input unit 43 controls input from the devices such as the keyboard, mouse and so on. The external memory 44 stores startup programs and various applications. The bus 45 is used to connect the above components.

After the training of the S network model is realized by using the solution of the first to the fourth exemplary embodiment of the disclosure, the trained S network model can be used to perform the application services. Taking a case where the security cameras have already stored the micro network model trained according to the manner of the first exemplary embodiment as an example, it is assumed that the security camera will perform target detection application, then after the security camera captures pictures as the data set, the captured pictures are input into the micro network model, so that the pictures is computed in each layer from top to bottom in the micro network model, and the target detection results are output. The present disclosure is also not limited to further perform a post-processing of output results, such as data classification, etc.

In correspondence with the application method described here, the present disclosure also describes the application apparatus of the neural network model, comprising: a storage for storing the trained network model; a receiving module for receiving the data set corresponding to the task requirement that can be performed by the stored network model; a processing module for computing the data set in each of layers from top to bottom in the stored network model, and outputting the results.

Alternatively, the application apparatus also includes a post-processing module for performing post-processing on the results output by the processing module.

Other Embodiments

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s) of the disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Embodiments of the disclosure can also be realized by a method of providing a software (program) executing the function of the above embodiments to a system or apparatus by network or various of storage mediums, and a computer or a central processing unit (CPU) and micro processing unit (MPU) of the system or the apparatus reading out and executing program.

While the disclosure has been described with reference to exemplary embodiments, it is to be understood that the disclosure is not limited to the disclosed exemplary embodiments. The scope of the following claims is to be accorded the broadest interpretation so as to encompass all such modifications to and equivalent structures and functions.

What is claimed is:

1. A method of training a multi-layer neural network model, comprising:
   determining a first network model that is a neural network having a plurality of layers and that has been trained to perform predetermined inference and a second network model that is different from the first network model, that is a neural network having a plurality of layers, and that is to be trained to perform inference different from the predetermined inference, the first network model providing information for training the second network model;
   setting a downscaling layer for at least one layer in the first network model, wherein the downscaling layer downscales the number of filters and filter kernel of the at least one layer in the first network model so that the number of filters and filter kernel of the at least one layer in the first network model are identical to those of layers to be trained in the second network model; and
   transmitting filter parameters downscaled by the downscaling layer to the second network model as training information.

2. The method according to claim 1, further comprising:
   dividing layers in the first network model into groups, wherein each group includes at least one layer and corresponds to one layer to be trained in the second network model; and
   wherein setting a downscaling layer for at least one layer in the first network model, comprises:
   setting a downscaling layer for each group in the first network model respectively, wherein the number of filters and the filter kernel of the downscaling layer set for the group are identical to those of the layers to be trained corresponding to the group.

3. The method according to claim 2 further comprising:
   training each of layers of the second network model by using the filter parameters of each downscaling layer as the training information, the output results of the first network model and the output results of the second network model.

4. The training method according to claim 2, wherein the downscaling layer sequentially includes a basis matrix layer and an identity mapping layer, wherein the number of filters and the filter kernel of the basis matrix layer are identical to those of the corresponding layer to be trained and size of an output feature map of the identity mapping layer is identical to that of the last layer in the group.

5. The training method according to claim 4, wherein the similarity between information saved in the output feature map of the basis matrix layer and information saved in the output feature map of the identity mapping layer is higher than a threshold.

6. The training method according to claim 5, further comprising:
   training the basis matrix layer and the identity mapping layer, such that the residual error between the output feature maps in a set of output feature maps of the last layer in the group and the output feature maps in a set of output feature maps of the identity mapping layer is less than a set value when the input feature map of the first layer in the group is identical to the input feature map of the basis matrix layer.

7. The training method according to claim 6, wherein the training of the basis matrix layer and the identity mapping layer and the training of the second network model are executed by a joint manner or an alternative manner.

8. The training method according to claim 2, wherein layers of which the type is the same as that of the corresponding layer to be trained is included in the group.

9. The training method according to claim 2, wherein a standardization layer is included in the group.

10. The training method according to claim 2, wherein the number of layers contained in the group is determined according to the depth of the first network model.

11. The training method according to claim 4, wherein the last layer in the group and the identity mapping layer have the same output precision, and the basis matrix layer and the layer to be trained corresponding to the group have the same output precision.

12. The training method according to claim 11, wherein the output precision is equal to or less than 32 bits.

13. A system for training a multi-layer neural network model, comprising:
   a server which stores at least one first network model that is a neural network having a plurality of layers and that has been trained to perform predetermined inference, the first network model providing information for training a second network model that is different from the first network model, that is a neural network having a plurality of layers, and that is to be trained to perform inference different from the predetermined inference,
   wherein the server sets a downscaling layer for at least one layer of the first network model, the downscaling layer downscales the number of filters and filter kernel of the at least one layer in the first network model so that the number of filters and filter kernel of the at least one layer in the first network model, and
   outputs filter parameters of the downscaling layer as training information, wherein the number of filters and filter kernels of the downscaling layer are identical to those of layers to be trained in the second network model;
   A terminal which stores the second network model, the terminal being used to train layers in the second network model by using training information output by the server.

14. The system according to claim 13, wherein
   the server further outputs the output results of the first network model as training information;
   the terminal trains each of layers to be trained of the second network model by using the filter parameters of the downscaling layer, the output results of the first network model and the output results of the second network model.

15. The system according to claim 13, wherein
the terminal initiates a picture processing request to the server, the picture processing request including a terminal identity and pictures requested to be processed;
the server further determines the terminal initiating the picture processing request and the second network model stored in the terminal according to the terminal identity in the received picture processing request.

16. The training system according to claim 15, wherein the server further
divides layers in the first network model into groups, wherein each group includes at least one layer and corresponds to one layer to be trained in the second network model, and
sets a downscaling layer for each group, wherein the number of filters and the filter kernel of the downscaling layer set for the group are identical to those of the layers to be trained corresponding to the group.

17. An apparatus for training a multi-layer neural network model, comprising:
a storage configured to store at least one network model, the network model providing information for training a network model in other apparatus;
one or more processors that are configured to set a downscaling layer for at least one layer of the network model stored in the storage, wherein the downscaling layer downscales the number of filters and the filter kernel of the at least one layer in the first network model so that the number of filters and filter kernel of the at least one layer in the first network model are identical to those of the layers to be trained in the network model in the other apparatus;
an output module configured to output filter parameters downscaled by the downscaling layer as training information to the other apparatus.

18. The training apparatus according to claim 17, further comprising:
a grouping module configured to dividing the layers in the network model stored in the storage into groups, wherein each group includes at least one layer and corresponds to one layer to be trained in the network model in the other apparatus;
wherein the processors are further used to set a downscaling layer for each group, wherein the number of filters and the filter kernel of the downscaling layer set for the group are identical to those of the layers to be trained corresponding to the group.

19. The training apparatus according to claim 18, wherein the output module is further used to output the output results of the network model stored in the storage as training information to the other apparatus.

20. The training apparatus according to claim 18, wherein the downscaling layer sequentially includes a basis matrix layer and an identity mapping layer, wherein the number of filters and the filter kernel of the basis matrix layer are identical to those of the corresponding layer to be trained and size of an output feature map of the identity mapping layer is identical to that of the last layer in the group.

21. The training apparatus according to claim 20, wherein the similarity between information saved in the output feature map of the basis matrix layer and information saved in the output feature map of the identity mapping layer is higher than a threshold.

22. The training apparatus according to claim 21, further comprising:
an internal training module configured to train the basis matrix layer and the identity mapping layer, such that the residual error between the output feature map of the last layer in the group and the output feature map of the identity mapping layer is less than a set value when the input feature map of the first layer in the group is identical to the input feature map of the basis matrix layer.

23. An application method of a multi-layer neural network model comprising:
storing a second network model trained based on a training method which comprises:
determining a first network model that is a neural network having a plurality of layers and that has been trained to perform predetermined infer and the second network model that is different from the first network model, that is a neural network having a plurality of layers, and that is to be trained to perform inference different from the predetermined inference, the first network model providing information for training the second network model;
setting a downscaling layer for at least one layer in the first network model, wherein the downscaling layer downscales the number of filters and filter kernel of the at least one layer in the first network model so that the number of filters and filter kernel of the at least one layer in the first network model are identical to those of layers to be trained in the second network model; and
transmitting filter parameters of downscaled by the downscaling layer to the second network model as training information;
receiving a data set corresponding to task requirements that can be executed by the stored second network model;
computing the data set in each of layers from top to bottom in the stored second network model, and outputting the results.

24. An application apparatus of a multi-layer neural network model, comprising:
a storage configured to store a second network model trained based on a training method which comprises:
determining a first network model that is a neural network having a plurality of layers and that has been trained to perform predetermined inference and the second network model that is different from the first network model, that is a neural network having a plurality of layers, and that is to be trained to perform inference different from the predetermined inference, the first network model providing information for training the second network model;
setting a downscaling layer for at least one layer in the first network model, wherein the downscaling layer downscales the number of filters and filter kernel of the at least one layer in the first network model so that the number of filters and filter kernel of the at least one layer in the first network model are identical to those of layers to be trained in the second network model; and
transmitting filter parameters downscaled by the downscaling layer to the second network model as training information;
a receiving module configured to receive a data set corresponding to task requirements that can be executed by the stored network model;

a processing module configured to compute the data set in each of layers from top to bottom in the stored network model, and output the results.

25. The application apparatus according to claim 24, further comprising:
a post-processing module configured to execute a post-processing on the results output by the processing module.

26. A non-transitory computer-readable storage medium storing instructions for causing a computer to perform a training method of a multi-layer neural network model according to a training method when executed by the computer, the training method comprises:
determining a first network model that is a neural network having a plurality of layers and that has been trained to perform predetermined inference and a second network model that is different from the first network model, that is a neural network having a plurality of layers, and that is to be trained to perform inference different from the predetermined inference, the first network model providing information for training the second network model;
setting a downscaling layer for at least one layer in the first network model, wherein the downscaling layer downscales the number of filters and filter kernel of the at least one layer in the first network model so that the number of filters and filter kernel of the at least one layer in the first network model are identical to those of layers to be trained in the second network model; and
transmitting filter parameters downscaled by the downscaling layer to the second network model as training information.

* * * * *